United States Patent
Lee et al.

(10) Patent No.: US 6,907,248 B2
(45) Date of Patent: Jun. 14, 2005

(54) APPARATUS AND METHOD FOR GATING DEDICATED PHYSICAL CONTROL CHANNEL IN A MOBILE COMMUNICATION SYSTEM

(75) Inventors: Hyun-Seok Lee, Kyonggi-do (KR); Ho-Kyu Choi, Seoul (KR); Sung-Ho Choi, Kyonggi-do (KR); Ki-Ho Jung, Kyonggi-do (KR); Hyun-Woo Lee, Kyonggi-do (KR); Jin-Weon Chang, Seoul (KR); Kook-Heui Lee, Kyonggi-do (KR); Ju-Ho Lee, Kyonggi-do (KR)

(73) Assignee: Samsung Electronics Co., Ltd. (KR)

( * ) Notice: Subject to any disclaimer, the term of this patent is extended or adjusted under 35 U.S.C. 154(b) by 478 days.

(21) Appl. No.: 09/887,388

(22) Filed: Jun. 22, 2001

(65) Prior Publication Data

US 2002/0082020 A1 Jun. 27, 2002

(30) Foreign Application Priority Data

Jun. 22, 2000 (KR) ........................................ 2000/34614
Sep. 19, 2000 (KR) ........................................ 2000/54983
May 18, 2001 (KR) ........................................ 2001/27414

(51) Int. Cl.[7] ................................................ H04Q 7/20
(52) U.S. Cl. ........................ 455/450; 455/522; 455/436; 370/35
(58) Field of Search ........................... 455/450, 509, 455/510, 511, 522, 69, 436; 370/349, 335, 342, 320, 322, 318, 326, 498, 352, 353, 436, 438, 350, 441

(56) References Cited

U.S. PATENT DOCUMENTS 6,587,447 B1 * 7/2003 Wang et al. ................ 370/335

FOREIGN PATENT DOCUMENTS

JP    2002-532987    2/2002
WO   WO 00/35225    6/2000

OTHER PUBLICATIONS

European search report dated Jan. 13, 2003, issued in a counterpart application, namley Appln. No. 01948059.9.
"Discussion Paper on DPCCH Gating Benefits", TSG–RAN Working Group 1/Nokia, May 11–25, 2000, pp. 1–7.
"Procedure of Gated DPCCH Transmission Associated with DSCH", TSG–RAN Working Group I/Samsung Electronics, Jul. 4–7, 2000, pp. 1–4.
Samsung Electronics Co., "Gated Transmission of DPCCH in DCH/DCH Control Only Substrates", TSG–RAN Working Group 1 Meeting #3, Apr. 18–20, 1999, pp. 1–6.

* cited by examiner

Primary Examiner—Jean Gelin
(74) Attorney, Agent, or Firm—Dilworth & Barrese LLP

(57) ABSTRACT

The present invention relates to a system for gating a dedicated physical control channel in a mobile communication system. A UTRAN (UMTS Terrestrial Radio Access Network) transmits a gating start command or a gating end command to a UE (User Equipment) through a specific transport format combination indicator symbol according to whether there exists data transmitted over a downlink physical shared channel and a dedicated physical data channel, thereby to start or end gating the dedicated physical control channel.

51 Claims, 32 Drawing Sheets

US 6,907,248 B2

APPARATUS AND METHOD FOR GATING DEDICATED PHYSICAL CONTROL CHANNEL IN A MOBILE COMMUNICATION SYSTEM

This application claims priority under 35 U.S.C. § 119 to Korean Application No. 2000-34614 filed on Jun. 22, 2000, Korean Application No. 2000-54983 filed on Sep. 19, 2000, and Korean Application No. 2001-27414 filed on May 18, 2001 with the Korean Industrial Property Office, the contents of which are hereby incorporated by reference.

BACKGROUND OF THE INVENTION

1. Field of the Invention

The present invention relates generally to a mobile communication system, and in particular, to an apparatus and method for gating a dedicated physical control channel signal to increase a user data transmission capacity.

2. Description of the Related Art

The applicant has proposed a technique for gating a dedicated physical control channel signal to 3GPP ($3^{rd}$ Generation Partnership Project) for standardization of UMTS (Universal Mobile Terrestrial System), which is a next generation mobile communication system. The dedicated physical control channel signal gating technique proposed by the applicant is a technique for gating a dedicated physical control channel signal if there is no data to transmit over a dedicated data channel established between a UTRAN (UMTS Terrestrial Access Network) and a UE (User Equipment) for a predefined time. Unlike the proposed technique for gating the dedicated physical control channel signal, the present invention relates to an apparatus and method for gating a dedicated physical control channel signal in a downlink physical shared channel/dedicated physical channel (DSCH/DCH) state where a UTRAN transmits data to a plurality of UEs over downlink physical shared channels and transmits control data and physical channel control signals over downlink dedicated physical channels, and the UEs then transmit control data and physical channel control signals over uplink dedicated physical channels.

First, a description will be made of a channel structure of an asynchronous UMTS (Universal Mobile Terrestrial System) mobile communication system.

The UMTS channels are classified into physical channels, transport channels and logical channels. A downlink channel of the physical channels is divided into a physical downlink shared channel (PDSCH) and a downlink dedicated physical channel (DPCH). The downlink dedicated physical channel is divided into a downlink dedicated physical control channel (DPCCH) and a downlink dedicated physical data channel (DPDCH). The downlink dedicated physical data channel DPDCH and the downlink dedicated physical control channel DPCCH are time-multiplexed within one slot and orthogonal-despread with associated orthogonal codes to be separated from other physical channels, and then spread with a unique scrambling code for the UTRAN before transmission. An uplink channel of the physical channels includes a dedicated physical channel (DPCH), which is divided into an uplink dedicated physical control channel (DPCCH) and an uplink dedicated physical data channel (DPDCH). The uplink dedicated physical data channel DPDCH and the uplink dedicated physical control channel DPCCH are orthogonal-spread with associated orthogonal codes to be separated from each other, and then summed up and spread with one scrambling code before transmission. A structure of the downlink dedicated physical channel will be described with reference to FIG. 1.

FIG. 1 illustrates a structure of a downlink dedicated physical channel for a mobile communication system. One frame of the downlink dedicated physical channel is comprised of 15 slots Slot#0–Slot#14, and each slot is comprised of a dedicated physical data channel DPDCH for transmitting upper layer data from a UTRAN to a UE, and a dedicated physical control channel DPCCH which includes a TPC (Transmit Power Control) symbol for controlling a physical layer control signal, i.e., transmission power of the UE, a TFCI (Transport Format Combination Indicator) symbol, and a Pilot symbol. As shown in FIG. 1, each slot of the dedicated physical channel is comprised of 2560 chips. A first data symbol Data1 and a second data symbol Data2 indicate the upper layer data transmitted from the UTRAN to the UE through the dedicated physical data channel DPDCH, and the TPC symbol indicates information for controlling transmission power of the UE, transmitted from the UTRAN to the UE. The TFCI symbol indicates with which TFC (Transport Format Combination) the downlink channel transmitted for the currently transmitted one frame (10 ms) has been transmitted, and the Pilot symbol provides a criterion based on which the UTRAN can control transmission power of the dedicated physical channel. Here, information included in the TFCI can be classified into a dynamic part and a semi-static part: the dynamic part includes transport block size information and transport block set size information, while the semi-static part includes information on TTI (Transmission Time Interval), channel coding method, coding rate, static rate matching and CRC size. Therefore, the TFCI indicates the number of transport blocks of the channel transmitted for one frame, and the TFCs that can be used at each transport block, to which numbers are assigned.

Next, a structure of the uplink dedicated physical channel will be described with reference to FIG. 2.

FIG. 2 illustrates a structure of an uplink dedicated physical channel for a mobile communication system. Like the downlink dedicated physical channel, one frame of the uplink dedicated physical channel is comprised of 15 slots Slot#0–Slot#14. Each slot of the dedicated physical data channel DPDCH of the uplink dedicated physical channel transmits the upper layer data from the UE to the UTRAN, and has the following format. That is, the slot is comprised of a Pilot symbol used as a channel estimation signal when the UE demodulates data to transmit to the UTRAN, a TFCI symbol indicating with which TFC the channels transmitted for the currently transmitted frame will transmit data, an FBI (FeedBack Information) symbol for transmitting feedback information when a transmission diversity technique is applied, and a TPC symbol for controlling transmission power of the downlink channel.

A process for controlling transmission power of the uplink dedicated physical channel and the downlink dedicated physical channel will be described hereinbelow.

First, a description will be made of a process for controlling transmission power of the uplink dedicated physical control channel and the uplink dedicated physical data channel. After defining the TPC=00 symbol value of the downlink dedicated physical channel as a power-up command to increase transmission power of the uplink dedicated physical control channel and the uplink dedicated physical data channel and further defining the TPC=11 symbol value of the downlink dedicated physical channel as a power-down command to decrease transmission power of the uplink dedicated physical control channel and the uplink dedicated physical data channel, the UTRAN controls transmission power of the dedicated physical control channel and the dedicated physical data channel of the UE, i.e., the uplink dedicated physical control channel and the uplink dedicated physical data channel, using the TPC symbol of the downlink dedicated physical channel. Whether to increase or decrease the transmission power of the uplink dedicated physical control channel and the uplink dedicated physical data channel is determined by the UTRAN depending on signal strength of a pilot symbol of the uplink dedicated physical control channel received from the UE. When the signal strength of the pilot symbol is higher than or equal to a predefined value, the UTRAN transmits a power-down command to the UE through the TPC symbol; in contrast, when the signal strength of the pilot symbol is lower than the predefined value, the UTRAN transmits a power-up command to the UE through the TPC symbol, thereby enabling the UE to transmit the uplink dedicated physical control channel and the uplink dedicated physical data channel at proper transmission power.

Second, a description will be made of a process for controlling transmission power of the downlink dedicated physical channel. After defining the TPC=00 symbol value of the uplink dedicated physical control channel as a power-up command to increase transmission power of the downlink dedicated physical channel and further defining the TPC=11 symbol value of the uplink dedicated physical control channel as a power-down command to decrease transmission power of the downlink dedicated physical channel, the UE controls transmission power of the downlink dedicated physical channel using the TPC symbol of the uplink dedicated physical control channel. Whether to increase or decrease the transmission power of the downlink dedicated physical channel from the UTRAN is determined by the UE depending on signal strength of a pilot symbol of the downlink dedicated physical channel received from the UTRAN. When the signal strength of the pilot symbol of the downlink dedicated physical channel is higher than or equal to a predefined value, the UE transmits a power-down command to decrease transmission power of the downlink dedicated physical channel through the TPC symbol of the uplink dedicated physical control channel; otherwise, when the signal strength of the pilot symbol of the received downlink dedicated physical channel is lower than the predefined value, the UE transmits a power-up command to increase transmission power of the downlink dedicated physical channel through the TPC symbol of the uplink dedicated physical control channel, thereby enabling the UTRAN to transmit the downlink dedicated physical channel at proper transmission power.

Next, a structure of the downlink physical shared channel will be described with reference to FIG. 3.

FIG. 3 illustrates a structure of a downlink physical shared channel for a mobile communication system. One frame of the downlink physical shared channel is comprised of 15 slots Slot#0–Slot#14. A chip rate of the UMTS system is 2.84 Mcps. The 15 slots each have 2560 chips, and transmit the upper layer data to the UE in association with the dedicated physical channel for designation of the TPC and the TFCI. The downlink physical shared channel is a channel for efficiently transmitting a large amount of packet data to the respective UEs, and is shared by a plurality of UEs. In order for the UEs to use the downlink physical shared channel, a separate dedicated physical channel must be maintained between the UEs and the UTRAN. That is, a downlink dedicated physical channel and an uplink dedicated physical channel, interlinked with the downlink physical shared channel, must be maintained between the UEs and the UTRAN. Since the downlink physical shared channel is shared by a plurality of UEs, the utilization efficiency of the downlink physical shared channel increases with the number of UEs sharing the downlink physical shared channel. That is, since the downlink physical shared channel is shared by a plurality of UEs, a certain UE must individually set up the downlink and uplink dedicated physical channels in order to use the downlink physical shared channel. For example, if N UEs share the downlink physical shared channel, the UEs each set up one downlink dedicated physical channel and one uplink dedicated physical channel, so that the N UEs use the N downlink dedicated physical channel and the N uplink dedicated physical channels. The downlink physical shared channel is a channel physically set to transmit a large amount of packet data, while the dedicated physical channel is a channel physically set to transmit a small amount of packet data and retransmission-related data, compared with the downlink physical shared channel.

As stated above, when the UE is provided with a packet data service, the downlink physical shared channel and the downlink dedicated physical channel are interlinked with each other, and this will be described with reference to FIGS. 4 and 5.

FIG. 4 illustrates a structure of a TFCI of a dedicated physical channel in a mobile communication system. As illustrated in FIG. 4, a $TFCI_{DPCH}$ symbol transmitted over the downlink dedicated physical channel is information indicating a transport format of the downlink physical shared channel. The downlink TFCI symbol indicates to which UE the packet data transmitted over the downlink physical shared channel is to be transmitted after a lapse of a predetermined time, and the UE can determine whether exists downlink physical shared channel data to be received, by constantly analyzing the downlink dedicated physical channel received. When the TFCI symbol received by the UE indicates that there exists data to be received by the UE on the downlink physical shared channel of the next frame, the UE must receive the downlink physical shared channel data at the frame. Hence, the UE receives the data transmitted by the UTRAN by demodulating and decoding the signal received over the downlink physical shared channel at the frame transmitted to the UE itself. In addition, the TFCI of the downlink physical shared channel is used to determine proper transmission power of the data transmitted over the downlink physical shared channel, and the UTRAN determines transmission power of the downlink physical shared channel on the basis of the proper transmission power of the downlink physical shared channel. With reference to FIG. 5, a description will be made of transmission power of the downlink physical shared channel and the downlink dedicated physical channel and structures thereof, when the downlink physical shared channel and the downlink dedicated physical channel are interlinked with each other as stated above, i.e., in the downlink shared channel/dedicated physical channel (DSCH/DCH) state.

FIG. 5 illustrates an interlinking scheme of a downlink physical shared channel and a downlink dedicated physical channel in a mobile communication system. As illustrated in FIG. 5, data communication in the normal downlink shared channel/dedicated physical channel (DSCH/DCH) state is proper for a service in which a UE has a short time for actually receiving data over the downlink physical shared channel (DSCH) and has a relatively long waiting time. In FIG. 5, the downlink shared channel is assumed to be a downlink physical shared channel, and the dedicated channel is assumed to be a dedicated physical channel. In the DSCH/DCH state, in order to maintain a proper channel state through power control for a waiting time, the UE performing data communication must transmit and receive a downlink dedicated channel DCH (i.e., a downlink dedicated physical channel signal) interlinked with the downlink shared channel, i.e., the downlink physical shared channel, and an uplink dedicated channel DCH (i.e., an uplink dedicated physical channel signal). As stated above, in order to maintain the downlink physical shared channel, the UE must continuously transmit and receive the downlink and uplink dedicated physical channel signals, causing battery consumption and an increase in interference to both the downlink and the uplink. As a result, the number of the UEs sharing the downlink physical shared channel is limited.

In addition, in the case of the downlink physical shared channel, the UEs time-divide the downlink physical shared channel after assigning radio resources to the downlink physical shared channel, and for efficient radio resource assignment to the downlink physical shared channel, it is important for a resource manager to have the downlink physical shared channel be always used. However, a generated amount and a generation time of data to be transmitted from the UTRAN to the UEs are irregular and unexpectable, so that it is not possible to constantly transmit data over the downlink physical shared channel.

Therefore, in order to increase efficiency of the downlink physical shared channel, it is necessary to increase the number of UEs sharing the downlink physical shared channel. That is, the increase in number of UEs using the downlink physical shared channel increases a probability that data will be transmitted over the downlink physical shared channel for a predetermined time, thereby resulting in an increase in utilization efficiency of the downlink physical shared channel. However, in order to increase the number of UEs sharing the downlink physical shared channel, it is necessary to set up the dedicated physical channels interlinked with the downlink physical shared channel for the respective UEs, so that the radio resources for setting up and maintaining the dedicated physical channels are required. Accordingly, the number of the dedicated physical channels, which can be simultaneously set up, is limited.

SUMMARY OF THE INVENTION

It is, therefore, an object of the present invention to provide an apparatus and method for gating a dedicated physical control channel when there is no data transmitted over a downlink physical shared channel and a dedicated physical data channel.

It is another object of the present invention to provide an apparatus and method for gating a dedicated physical control channel to increase transmission efficiency of a downlink physical shared channel.

It is further another object of the present invention to provide an apparatus and method for gating a dedicated physical control channel to compensate for quality deterioration of a dedicated physical data channel due to a gating operation.

It is yet another object of the present invention to provide an apparatus and method for gating a dedicated physical control channel to compensate for quality deterioration of a TFCI symbol due to a gating operation.

It is still another object of the present invention to provide an apparatus and method for gating a dedicated physical control channel to compensate for quality deterioration of a downlink physical shared channel due to a gating operation.

It is still another object of the present invention to provide a dedicated physical control channel gating apparatus and method, in which a UE currently performing a gating operation requests an end of the gating operation.

It is still another object of the present invention to provide a dedicated physical control channel gating apparatus and method for providing interlayer interfacing by providing a gating start and end message protocol.

It is still another object of the present invention to provide a dedicated physical control channel gating apparatus and method for maintaining a gating operation according to a handoff of a UE currently performing the gating operation.

It is still another object of the present invention to provide a dedicated physical control channel gating apparatus and method for reliably transmitting a gating signaling through a user plane.

According to one aspect of the present invention, an apparatus for gating a dedicated physical control channel in a UTRAN having a downlink physical shared channel, shared by a plurality of UEs, for transmitting data, a dedicated physical control channel interlined with the downlink physical shared channel, for transmitting control data, and a dedicated physical data channel for transmitting user data, comprises a gating command generator for generating a gating start request for the dedicated physical control channel when there exists no data transmitted over the downlink physical shared channel and the dedicated physical data channel for a preset time, generating a gating end request when data to be transmitted over the downlink physical shared channel is generated while gating the dedicated physical control channel, and generating a gating start command or a gating end command to start or end a gating operation according to the gating start request or the gating end request; and a transmitter for inserting the created gating start command or gating end command in a specific transport format combination indicator symbol of the dedicated physical control channel, and transmitting the specific transport format combination indicator symbol to a corresponding UE.

According to another aspect of the present invention, an apparatus for gating a dedicated physical control channel in a UE sharing a downlink physical shared channel and having a dedicated physical control channel for receiving control data and a dedicated physical data channel for receiving user data, comprises a dedicated physical control channel receiver for receiving a dedicated physical control channel signal; and a gating controller for analyzing a transport format combination indicator symbol of the received dedicated physical control channel signal, starting gating on the dedicated physical control channel when the transport format combination indicator symbol includes a gating start command for the dedicated physical control channel, and ending gating on the dedicated physical control channel when the transport format combination indicator symbol includes a gating end command.

According to further another aspect of the present invention, a method for gating a dedicated physical control channel in a UTRAN having a downlink physical shared channel, shared by a plurality of UEs, for transmitting data, a dedicated physical control channel interlined with the downlink physical shared channel, for transmitting control data, and a dedicated physical data channel for transmitting user data, comprises the steps of generating a gating start request for the dedicated physical control channel when there exists no data transmitted over the downlink physical shared channel and the dedicated physical data channel for a preset time, generating a gating end request when data to be transmitted over the downlink physical shared channel is generated while gating the dedicated physical control channel, and generating a gating start command or a gating end command to start or end a gating operation according to the gating start request or the gating end request; and inserting the created gating start command or gating end command in a specific transport format combination indicator symbol of the dedicated physical control channel, and transmitting the specific transport format combination indicator symbol to a corresponding UE.

According to yet another aspect of the present invention, a method for gating a dedicated physical control channel in a UE sharing a downlink physical shared channel and having a dedicated physical control channel for receiving control data and a dedicated physical data channel for receiving user data, comprises the steps of receiving a dedicated physical control channel signal; and performing a gating start operation or a gating end operation on the dedicated physical control channel according to a gating start command or a gating end command, when a transport format combination indicator symbol of the received dedicated physical control channel signal indicates the gating start command or the gating end command for the dedicated physical control channel.

DETAILED DESCRIPTION OF THE PREFERRED EMBODIMENTS

A preferred embodiment of the present invention will be described herein below with reference to the accompanying drawings. In the following description, well-known functions or constructions are not described in detail since they would obscure the invention in unnecessary detail.

Figure 6:
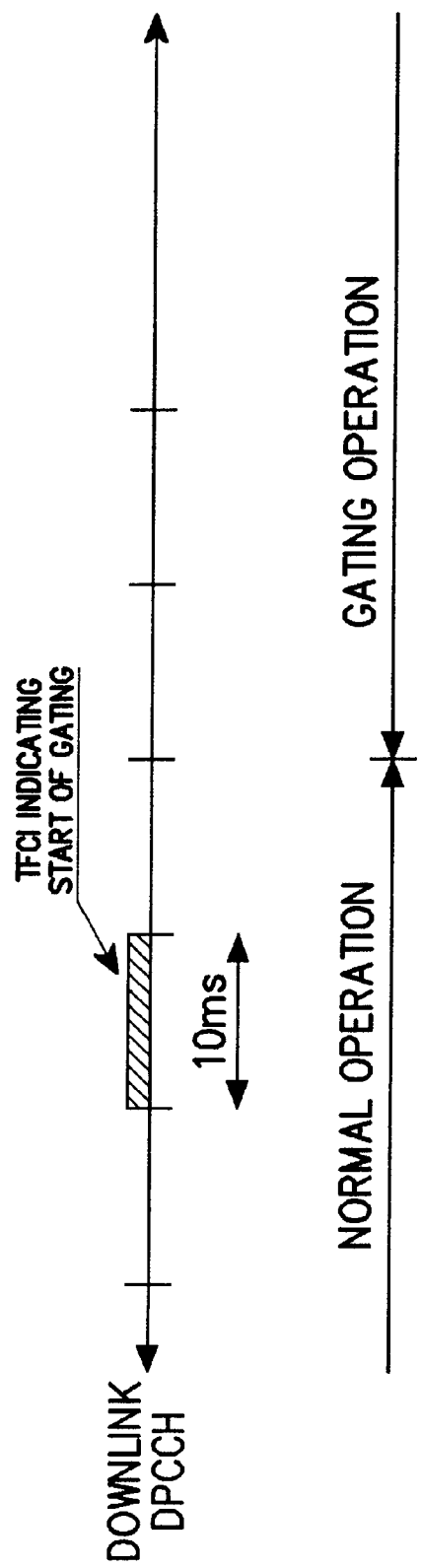
FIG. 6 is a diagram illustrating a gating start point of a dedicated physical control channel caused by a gating start command according to an embodiment of the present invention.

FIG. 6 illustrates a gating start point of a dedicated physical control channel caused by a gating start command according to an embodiment of the present invention.

Figure 1:
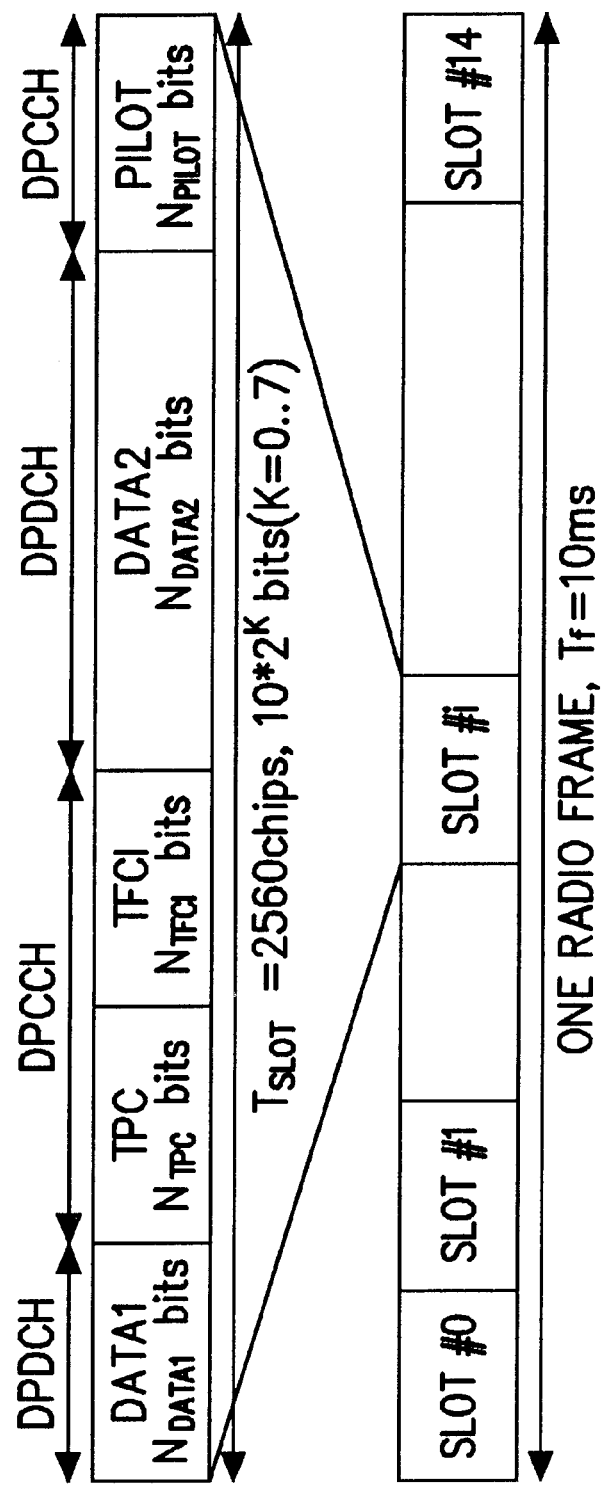
FIG. 1 is a diagram illustrating a structure of a downlink dedicated physical channel for a mobile communication system.
Figure 2:
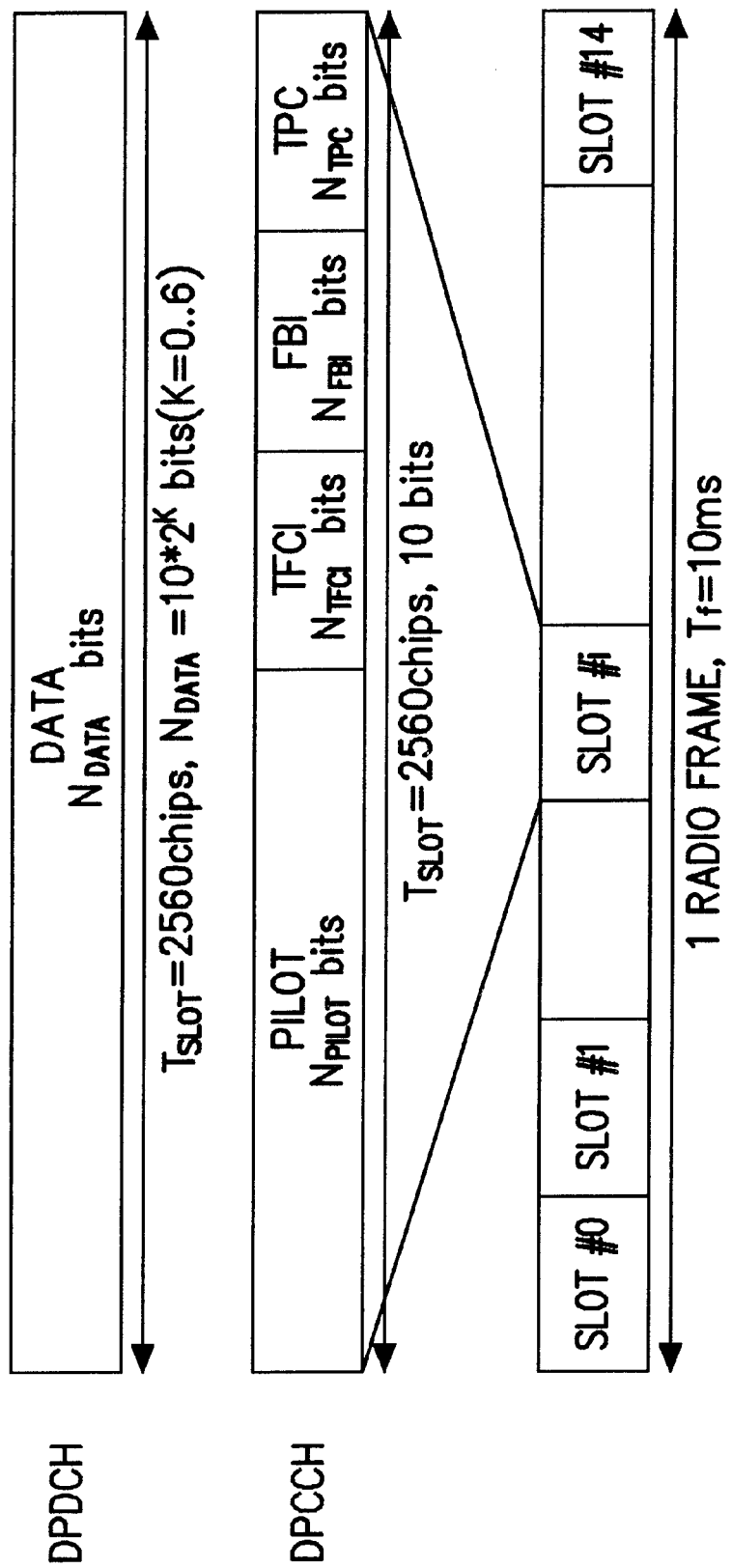
FIG. 2 is a diagram illustrating a structure of an uplink dedicated physical channel for a mobile communication system.
Figure 3:
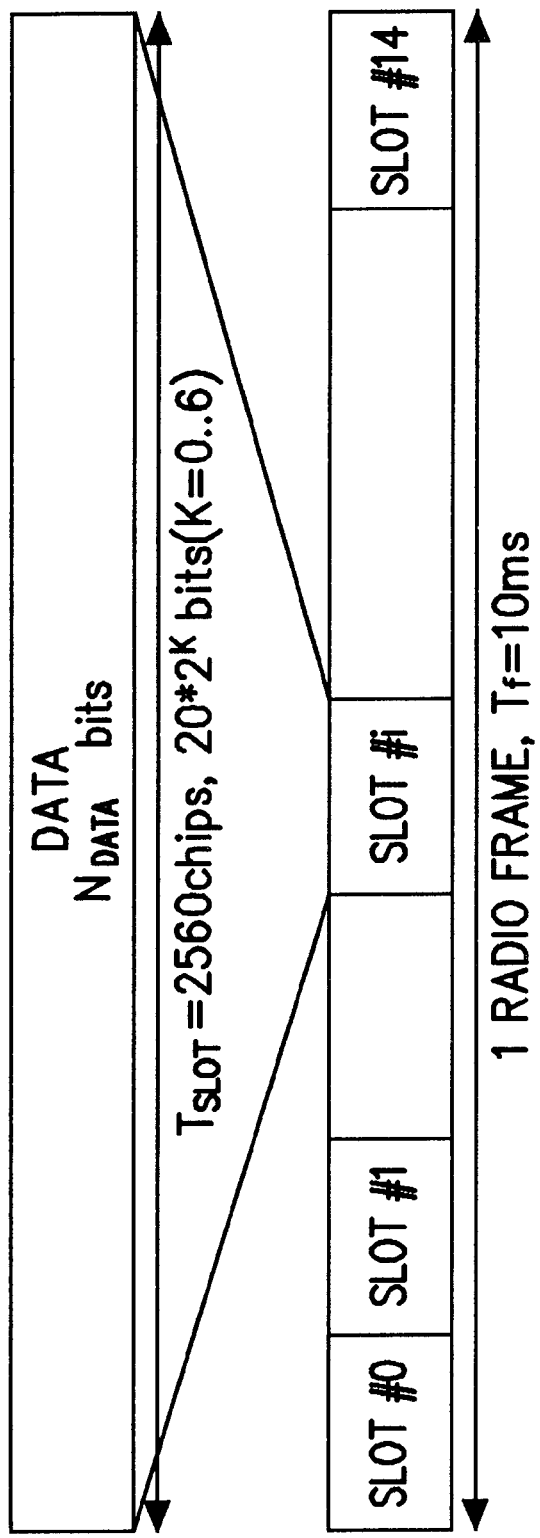
FIG. 3 is a diagram illustrating a structure of a downlink physical shared channel for a mobile communication system.
Figure 4:
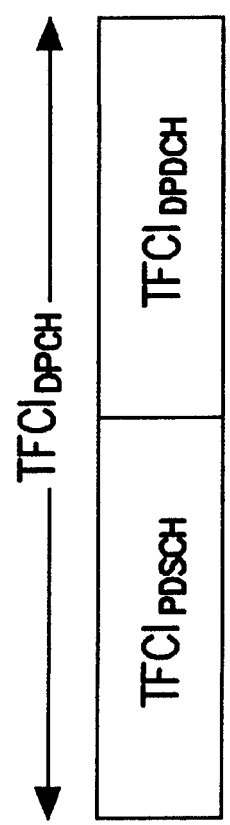
FIG. 4 is a diagram illustrating a structure of a TFCI of a dedicated physical channel in a mobile communication system.
Figure 5:
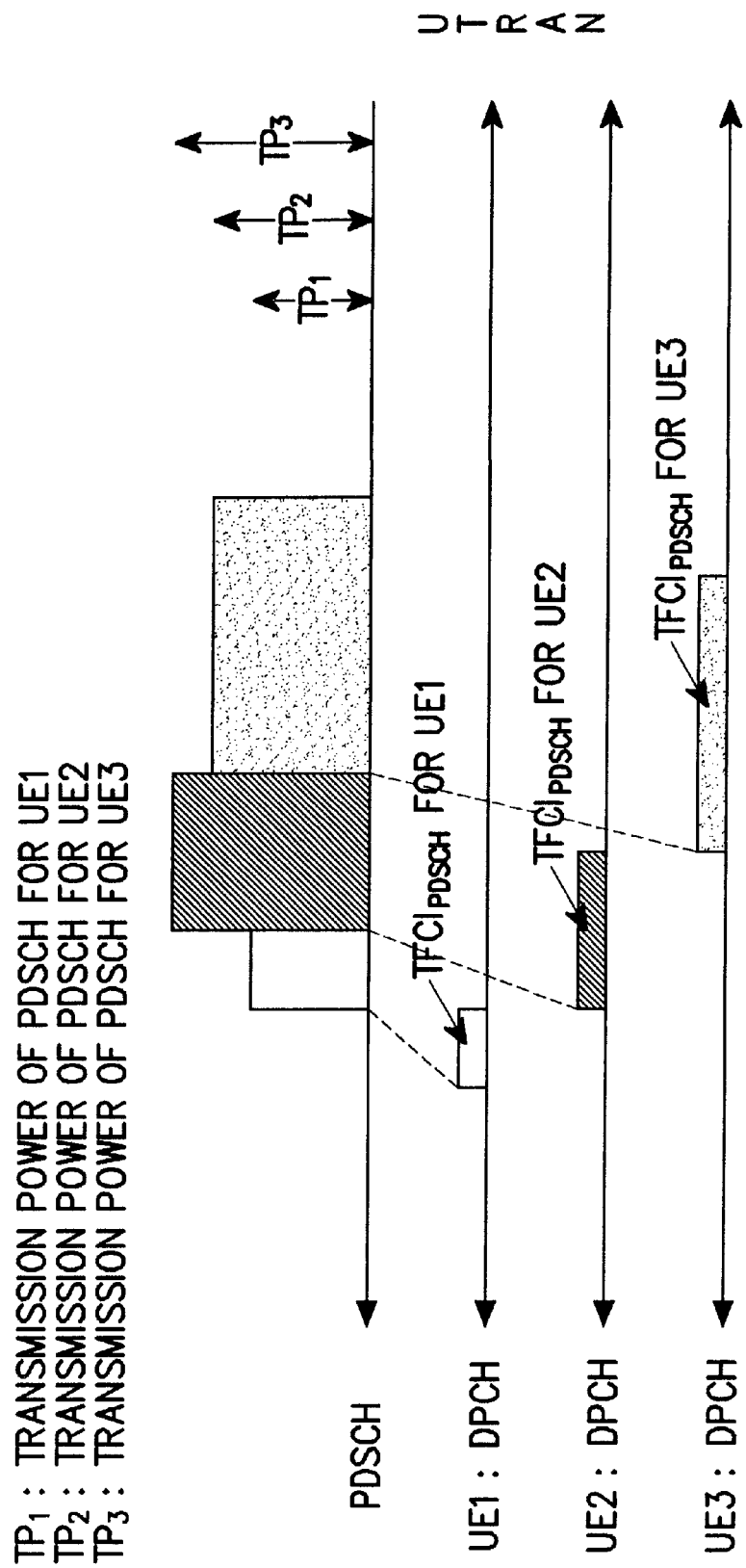
FIG. 5 is a diagram illustrating an interlinking scheme of a downlink physical shared channel and a downlink dedicated physical channel in a mobile communication system.

As described before in FIG. 4, when a certain UE uses the downlink physical shared channel, a dedicated physical channel interlinked with the downlink physical shared channel is set up in the UE, and when the downlink physical shared channel and the dedicated physical channel are interlinked with each other, a TFCI symbol of the dedicated physical channel has a structure including a $TFCI_{PDSCH}$ symbol of the downlink physical shared channel and a $TFCI_{DPDCH}$ symbol of the dedicated physical data channel. The TFCI symbol is coded by TFCI coding and then wirelessly transmitted. In an embodiment of the present invention, a specified one bit among the TFCI symbol bits of the downlink dedicated physical channel DPCH can be defined as a command to start gating the dedicated physical control channel DPCCH by transmitting the specified bit over the dedicated physical control channel. When a time interval where there exists no data to be transmitted to a specific UE through the downlink physical shared channel and the dedicated physical data channel lasts over a predetermined time interval, or when the system is required to start gating the dedicated physical control channel for another reason, the UTRAN transmits a gating start command to the specific UE, using a specified one bit of the TFCI symbol of the downlink dedicated physical channel. At this point, the UTRAN can issue a gating start command, when both the downlink physical shared channel and the dedicated physical data channel have no data to transmit to the UEs. The TFCI symbol is information indicating with which TFC the channel transmitted for the currently transmitted one frame is to be transmitted, and includes information on the number of transport blocks per transport channel, transmitted for one frame, and transport block size information. Here, as one example of the TFCI bit $TFCI_{PDSCH}$ which can be used as a gating start command, it is possible to use $TFCI_{PDSCH}$ of which the number of the transport blocks is not '0' and the transport block size is '0', or the maximum value $TFCI_{MAX}$ or the minimum value $TFCI_{MIN}$ of $TFCI_{PDSCH}$.

When the UTRAN transmits the gating start command to the UE using the specific bit of the TFCI symbol through the downlink dedicated physical channel in this manner, the UE then receives a downlink dedicated physical channel signal and starts gating the dedicated physical control channel if the specific TFCI bit included in the received downlink dedicated physical channel signal indicates a gating start command for the dedicated physical control channel. The UTRAN can also start a downlink dedicated physical control channel gating operation in sync with the time when the UE starts the uplink dedicated physical control channel gating operation. In addition, an interval between a time point where information indicating gating on the dedicated physical control channel signal, i.e., a gating start command is transmitted from the UTRAN to the UE and a time point where gating on the dedicated physical control channel is actually started, can: be either variably determined by the system or transmitted through a broadcasting channel. If the interval between the time point where the gating start command is transmitted from the UTRAN to the UE and the time point where the dedicated physical control channel gating operation is actually started is fixed, it is not necessary to transmit information on the interval between the time point where the gating start command is transmitted and the time point where the gating is actually started, through the broadcasting channel. FIG. 6 shows a case where a time interval (hereinafter, referred to as a "gating start waiting time") between a time point for transmitting a gating start command for the dedicated physical control channel and an actual gating start point of the dedicated physical control channel is one frame (10 ms). In this case, if the UTRAN transmits a gating start command, the UE actually starts a gating operation after a lapse of one frame from the transmission point. However, when the gating start command for the dedicated physical control channel fails to be normally transmitted to the UE due to a transmission error, an error of the gating start command must be overcome in order to normally start gating the dedicated physical control channel. A process for overcoming an error of the gating start command will be described with reference to FIG. 7.

Figure 7:
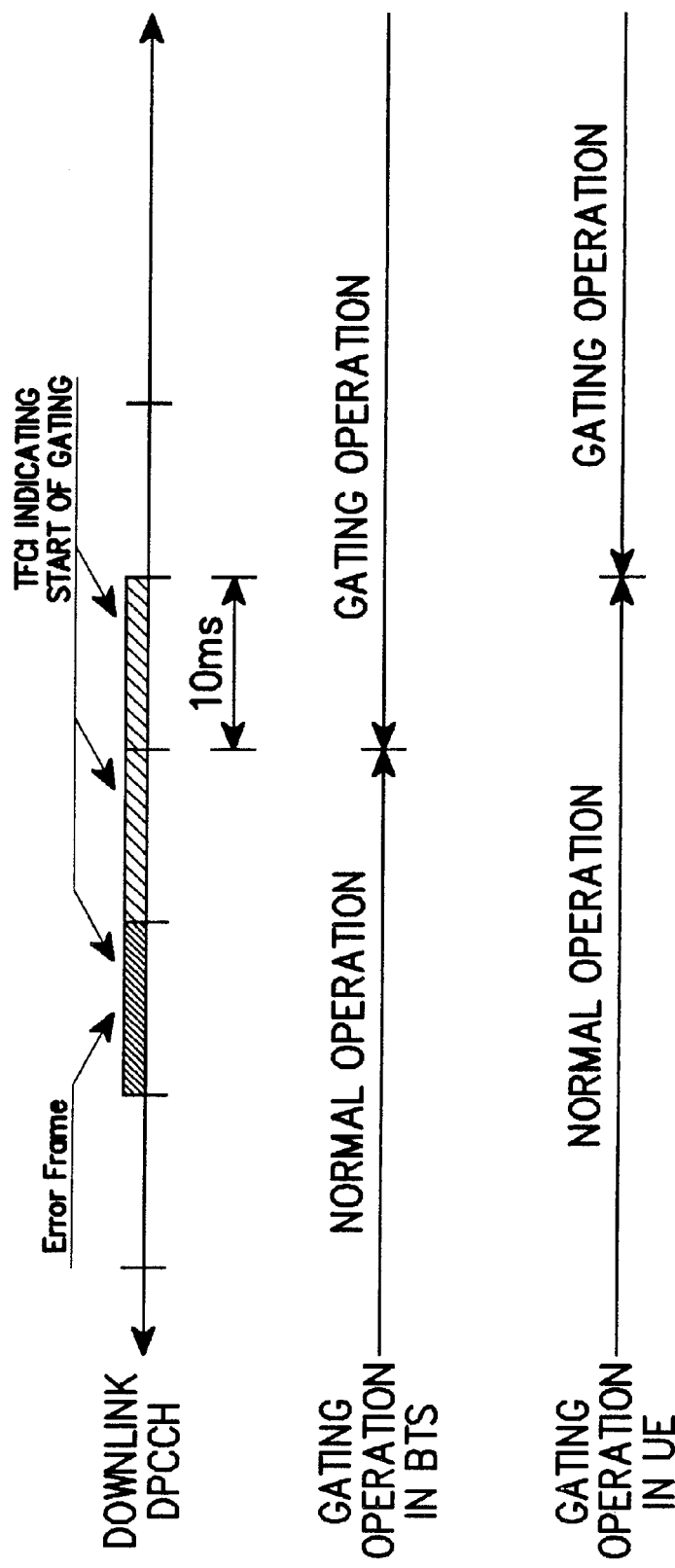
FIG. 7 is a diagram illustrating a gating start point of a dedicated physical control channel caused by a gating start command transmission error according to another embodiment of the present invention.

FIG. 7 illustrates a gating start point of a dedicated physical control channel caused by a gating start command transmission error according to another embodiment of the present invention. As illustrated in FIG. 7, in order to remove a gating start error for the dedicated physical control channel caused by the gating start command transmission error, the UTRAN repeatedly transmits a gating start command indicating a start of the dedicated physical control channel gating operation, i.e., the TFCI symbol of the downlink physical shared channel to the UE over a plurality of frames. The UE then determines an actual gating start point on the basis of a time point where it has received a first gating start command among the gating start commands repeatedly received over a plurality of frames. In other words, the UE determines the actual gating start point on the basis of the time point where it has an error-free gating start command, and ignores the gating start commands received after starting the gating operation.

The gating start point of the dedicated physical control channel for overcoming the gating start command error is shown in FIG. 7, wherein it is assumed that when the TFCI symbol of the downlink physical shared channel is repeatedly transmitted over a plurality of consecutive frames, e.g., 3 consecutive frames on the downlink dedicated physical control channel, an error has occurred in a first frame. Since the error has occurred in the first frame, the UTRAN actually starts gating at a second frame and the UE starts the gating operation after a lapse of the gating start waiting time from the second frame, i.e., starts the gating operation at a third frame. Herein, a difference between the gating start command reception time and the gating start time is about one frame. Of course, in the case where the UTRAN repeatedly transmits the gating start command for the dedicated physical control channel over several frames, if an error has occurred in the several gating start commands, the UE may continuously perform the normal operation even though the UTRAN has already started the gating operation on the dedicated physical control channel. Therefore, in order to prevent the UE from continuously performing the normal operation even though the UTRAN has already started the gating operation on the dedicated physical control channel, the UTRAN intermittently transmits to the UE during the gating operation the TFCI symbol of the downlink physical shared channel, indicating that the dedicated physical control channel is performing the gating operation. A period and frequency of transmitting the TFCI symbol of the downlink physical shared channel indicating that the dedicated physical control channel is performing the gating operation, can be variably determined by the UTRAN. In addition, in order to overcome the error of the gating start command for the dedicated physical control channel, the UTRAN increases transmission power of the TFCI symbol, i.e., a gating start command, of the downlink physical shared channel, compared with the TFCI symbol in the normal operation, thereby to increase reliability. Although the invention has been described with reference to an embodiment where the UTRAN transmits the gating start command using the $TFCI_{PDSCH}$ symbol of the downlink physical shared channel, it can also be applied to a case where the UTRAN transmits the gating start command using the $TFCI_{DPDCH}$ symbol of the dedicated physical data channel.

Now, the above-described gating start process by the UTRAN according to an embodiment of the present invention will be described with reference to FIG. 8.

Figure 8:
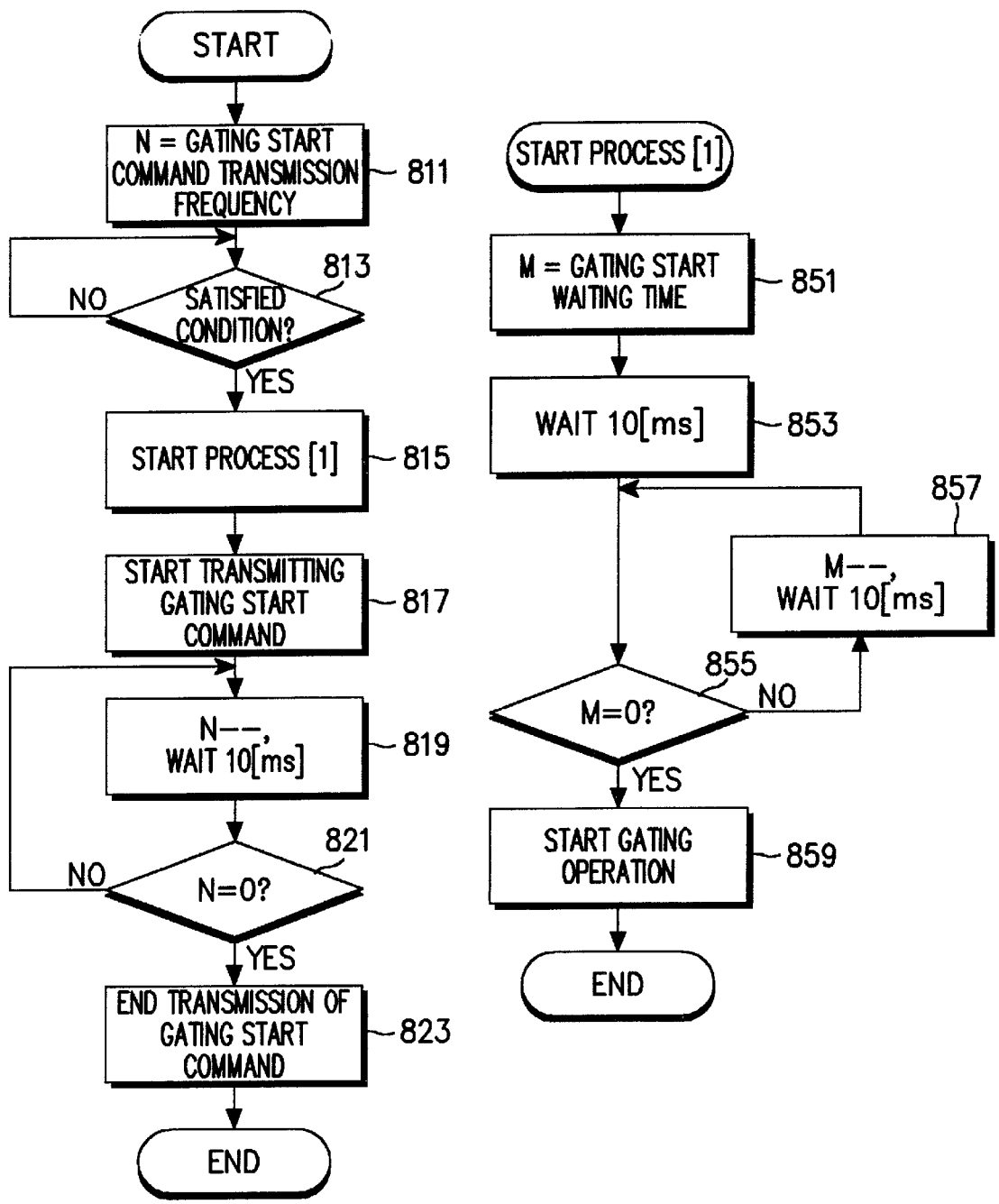
FIG. 8 is a flow chart illustrating a gating start process by UTRAN according to another embodiment of the present invention.

FIG. 8 is a flow chart illustrating a gating start process by a UTRAN according to another embodiment of the present invention. In step 811, the UTRAN sets a transmission frequency N indicating how many times it will consecutively transmit the TFCI symbol of the downlink physical shared channel, the TFCI symbol indicating a gating start command for the dedicated physical control channel. If a gating start condition for the dedicated physical control channel is satisfied in step 813, i.e., upon detecting occurrence of a gating start request, the UTRAN proceeds to step 813. For example, when there exists no data to transmit over the dedicated physical data channel and the downlink physical shared channel for a predefined time, or upon detecting occurrence of a gating start request at a system's request, the UTRAN proceeds to step 815. The UTRAN starts a process [1] in step 815 and then proceeds to step 817. The process [1] will be described below. In step 851, the UTRAN sets a gating start waiting time M as the gating start request occurs. In step 853, the UTRAN waits the predefined gating start waiting time M. When the gating start waiting time M has elapsed: in step 855, the UTRAN starts gating the downlink dedicated physical control channel in step 859. However, when the gating start waiting time M has not elapsed in step 855, the UTRAN continuously waits the gating start waiting time M in step 857.

While performing the process [1], the UTRAN starts transmitting the gating start command in step 817 and then proceeds to step 819. In step 819, the UTRAN counts down the set gating start command transmission frequency N, each time it transmits the gating start command. The UTRAN determines in step 821 whether a down-counted value of the set gating start command transmission frequency N has reached zero (0). If the down-counted value of the gating start command transmission frequency N has reached zero, it means that the gating start command has been transmitted as many times as the set transmission frequency, so that the UTRAN ends transmission of the gating start command in step 823.

When the UTRAN transmits the gating start command in this manner, the UE starts gating the dedicated physical control channel. This will be described with reference to FIG. 9.

Figure 9:
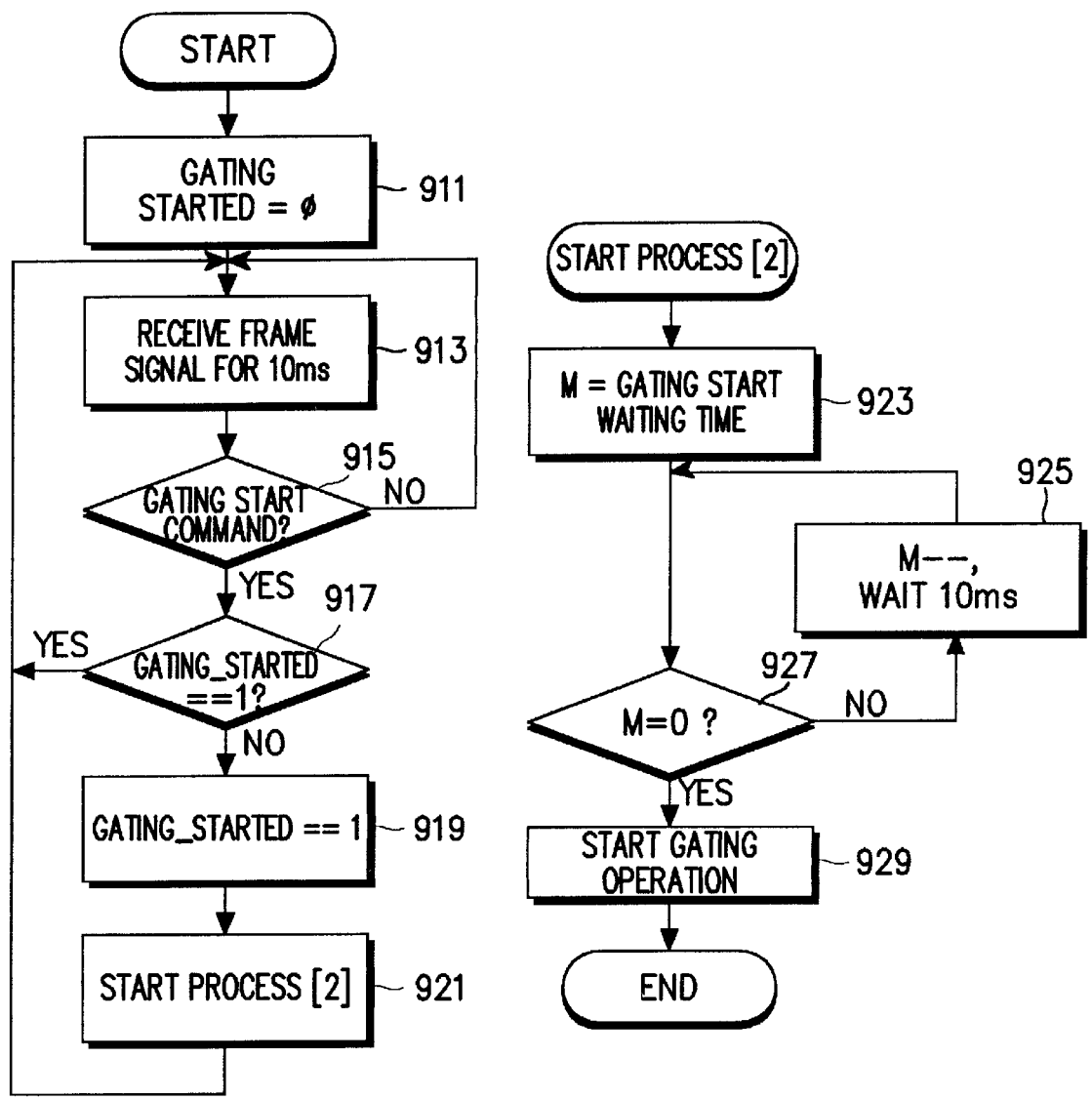
FIG. 9 is a flow chart illustrating a gating start process by a UE according to an embodiment of the present invention.

FIG. 9 is a flow chart illustrating a gating start process by a UE according to an embodiment of the present invention. In step 911, the UE operates in a normal mode so that a gating start indication parameter Gating_Started is set to '0'. In step 913, the UE receives the downlink dedicated physical channel signal in a frame unit in the normal mode of operation. In step 915, the UE determines whether a gating start command is included in the received frame, i.e., whether a gating start command is included in the TFCI symbol of the received downlink physical shared channel. If the gating start command is included in the received downlink physical shared channel, the UE determines in step 917 whether the gating start parameter value is '1' (Gating_Started=1). If the gating start parameter value is Gating_Started=1, it means that the UE is performing the gating operation on the dedicated physical control channel. If, however, the gating start parameter value is Gating_Started=0, it means that the UE is performing a normal operation. As the result of the determination, if the gating start parameter value is stored as Gating_Started=1, it indicates that the UE is currently performing the gating operation, so that the UE returns to step 913 to receive the channel signal. In contrast, if the gating start parameter value is stored as Gating_Started=0, the UE stores the gating start parameter value as Gating_Started=1 in step 919. Thereafter, in step 921, the UE starts a process [2]. The process [2] will be described below. In step 923, the UE detects the gating start waiting time M which is previously set between the UTRAN and the UE. Thereafter, the UE determines in step 927 whether the gating start waiting time M has elapsed. If the gating start waiting time M has elapsed, the UE starts gating the dedicated physical control channel in step 929. If, however, gating start waiting time M has not elapsed in step 927, the UE waits the gating start waiting time M in step 925 and then proceeds to step 927.

Meanwhile, though not illustrated in detail in the drawing, it is also possible to command the UTRAN to start gating the dedicated physical control channel using a message capable of changing the physical channel's characteristic among upper layer (Layer 3) control messages. That is, when there exists no data to transmit over the downlink physical shared channel and the dedicated physical data channel for a predetermined time period, the UTRAN sends to the UE a Layer-3 control message with a gating start command for the dedicated physical control channel and a gating start waiting time, and the UE then transmits to the UTRAN a response signal indicating that the Layer-3 control message has been normally received, thus initiating the gating operation.

Heretofore, the process for starting gating the dedicated physical control channel has been described. Next, a process for ending gating on the dedicated physical control channel currently being gated will be described below.

First, with reference to FIG. 10, a description will be made of a gating end starting point of the dedicated physical control channel caused by a gating end command according to a first embodiment of the present invention.

Figure 10:
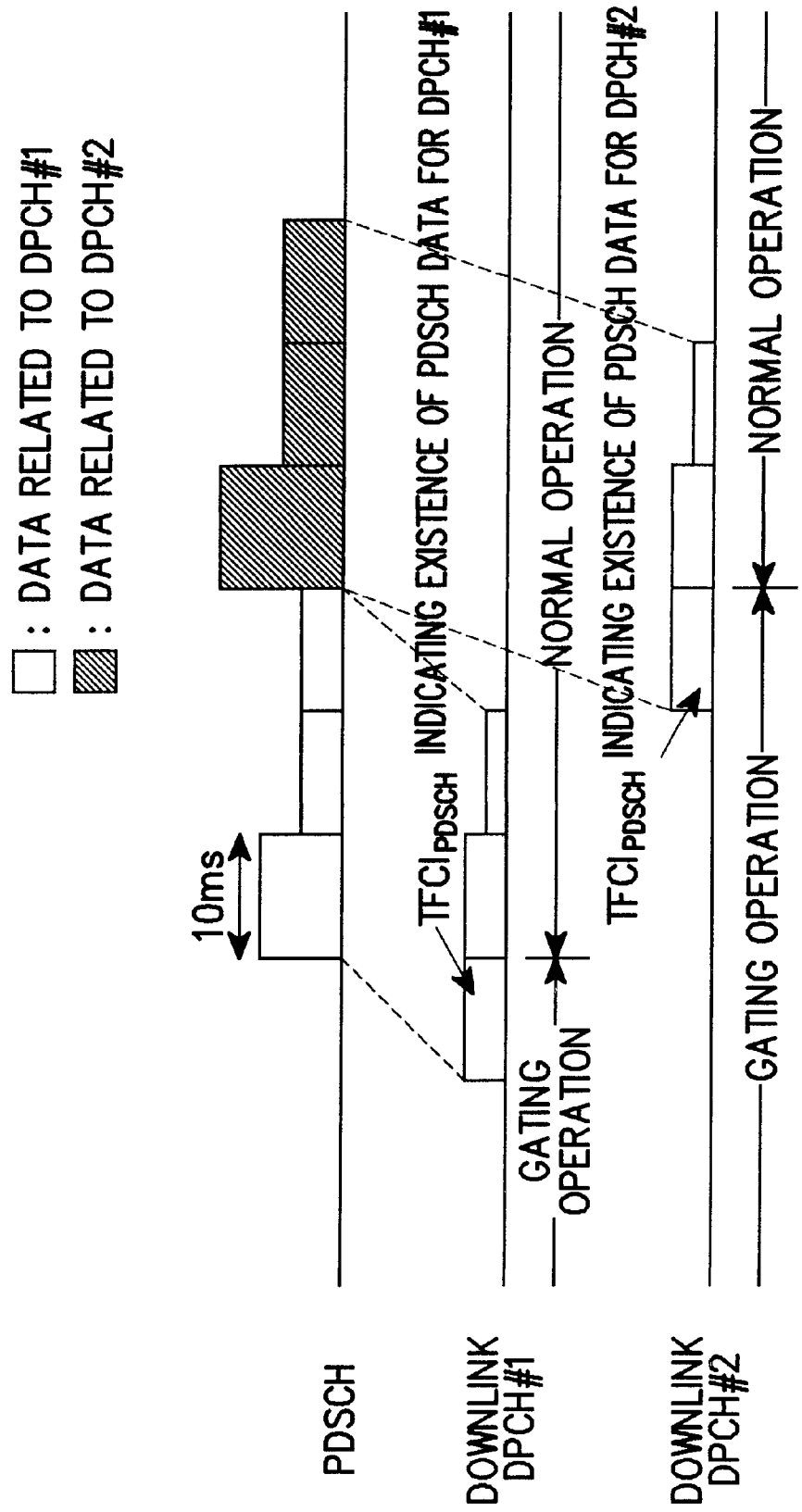
FIG. 10 is a diagram illustrating a gating end starting point of a dedicated physical control channel caused by a gating end command according to a first embodiment of the present invention.

FIG. 10 is a diagram illustrating a gating end starting point of a dedicated physical control channel caused by a gating end command according to a first embodiment of the present invention. When there exists data to transmit over the downlink physical shared channel, the UTRAN must necessarily end the gating operation. However, when there exists a small amount of data to transmit over the dedicated physical data channel, the UTRAN may either end or not end the gating operation on the dedicated physical control channel. That is, it means that it is possible to maintain the gating operation on the dedicated physical control channel while transmitting a small amount of data over the dedicated physical data channel. Therefore, the gating end condition is that there exists data in the downlink physical shared channel or there exists a small amount of data to be transmitted over the dedicated physical data channel. That is, when there exists a small amount of data to transmit over the dedicated physical data channel, it is possible to either end the gating operation or transmit the data without ending the gating operation. As shown in FIG. 10, in the gating end method according to the first embodiment of the present invention, the UTRAN transmits a signal indicating that there exists data to receive through the downlink physical shared channel, using the $TFCI_{PDSCH}$ symbol of the downlink physical shared channel on the downlink dedicated physical channel, and upon receipt of the TFCI symbol of the downlink physical shared channel on the downlink dedicated physical channel, the UE ends the gating operation on the dedicated physical control channel currently being subjected to the gating operation, beginning at this point.

As another example of transmitting the gating end command to the UE, a specific bit value among the $TFCI_{PDSCH}$ symbol of the downlink physical shared channel on the downlink dedicated physical channel, i.e., a $TFCI_{PDSCH}$ symbol in which a symbol value $TFCI_{MIN}+1$ coming next to the minimum value of the $TFCI_{PDSCH}$, a symbol value $TFCI_{MAX}-1$ coming before the maximum value of the $TFCI_{PDSCH}$ or the transport block number has a value of '0', is previously defined as the gating end command, so that the UE in a gating operation may end the gating operation upon receipt of the gating end command.

When the gating operation is ended in the above-stated method, a power control on the transmitted downlink physical shared channel may become unstable while analyzing the $TFCI_{PDSCH}$ symbol of the downlink physical shared channel and recovering the power control operation of the dedicated physical control channel, and accordingly, reliability of the gating end operation may be lowered. Therefore, in order to increase the reliability of the gating end operation, when ending the gating operation as data to transmit over the downlink physical shared channel is generated while gating the dedicated physical control channel, the UTRAN increases transmission power of first N frames among the $TFCI_{PDSCH}$ frames of the downlink physical shared channel, compared with the transmission power of the general TFCI frames, and also increases transmission power of first (N-1) frames of the associated downlink physical shared channel, compared with the transmission power of the general downlink physical shared channel frames. Thus, the reliability of the gating end operation on the dedicated physical control channel is increased by preventing an increase in an error rate of the downlink physical shared channel data and the $TFCI_{PDSCH}$ symbols of the downlink physical shared channel, due to the unstable power control. Herein, 'N' indicates the number of TFCI fames of the downlink physical shared channel to be transmitted at increased transmission power, and the number N can be adaptively selected according to the channel environment. FIG. 10 shows an example where N is set to 2. 5 A gating end process by the UTRAN according to the gating end command shown in FIG. 10 will be described below with reference to FIG. 11.

Figure 11:
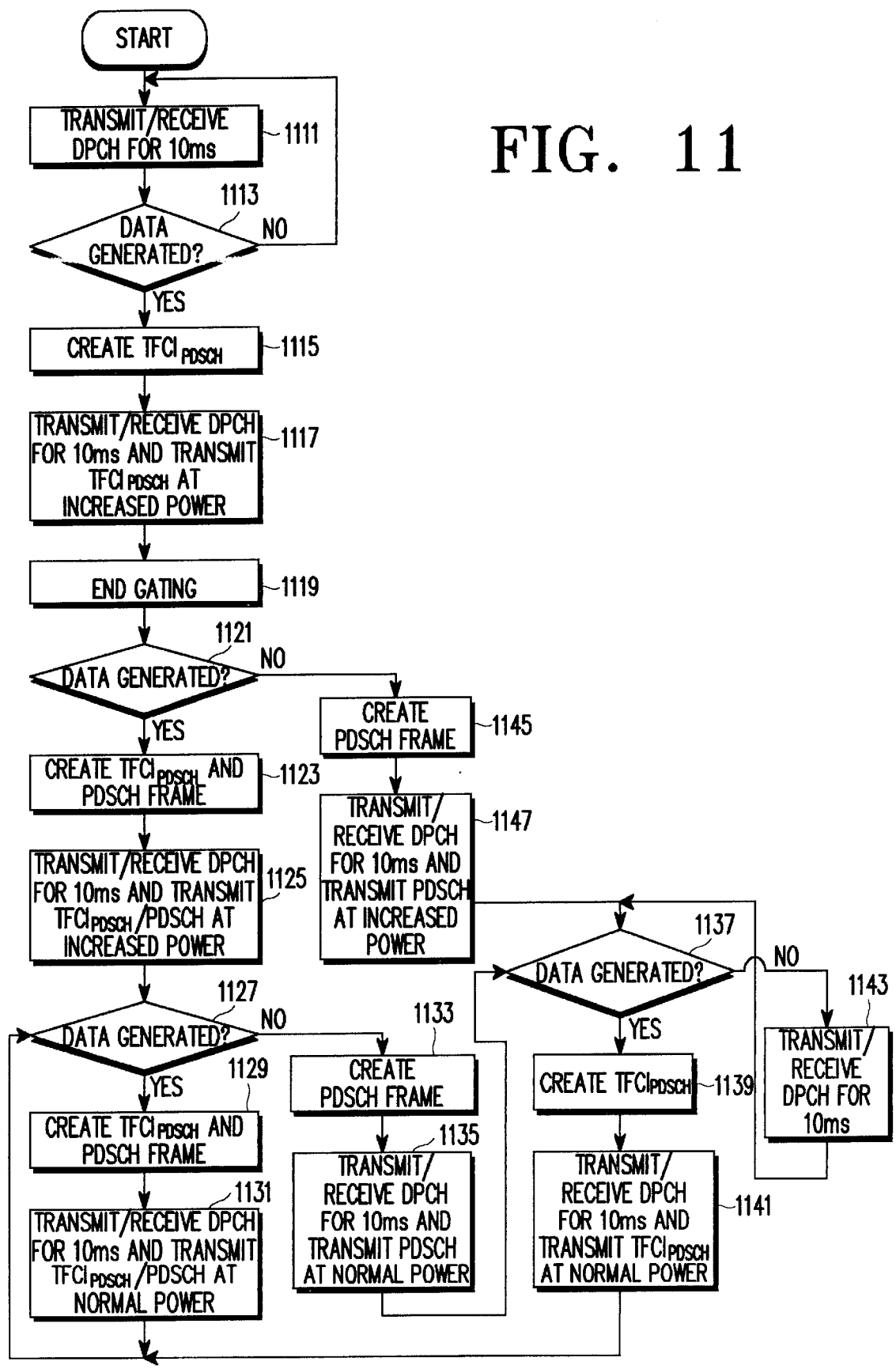
FIG. 11 is a flow chart illustrating a gating end process by a UTRAN according to the gating end command of FIG. 10.

FIG. 11 is a flow chart illustrating a gating end process by a UTRAN according to the gating end command of FIG. 10. In step 1111, the UTRAN performs an operation of transmitting and receiving the dedicated physical channel DPCH. Upon receiving a dedicated physical channel signal, the UTRAN determines in step 1113 whether data to be transmitted at the next frame over the downlink physical shared channel is generated, using the $TFCI_{PDSCH}$ symbol of the downlink physical shared channel on the dedicated physical channel. If data to be transmitted over the downlink physical shared channel is generated, the UTRAN creates in step 1115 a $TFCI_{PDSCH}$ symbol of the downlink physical shared channel, indicating a gating end command to end a gating operation on the dedicated physical control channel. In step 1117, the UTRAN transmits the created $TFCI_{PDSCH}$ symbol of the downlink physical shared channel at preset transmission power higher than the normal transmission power. In step 1119, the UTRAN ends the gating operation on the dedicated physical control channel. Thereafter, the UTRAN determines in step 1121 whether data to be transmitted at the next frame over the downlink physical shared channel is generated. If data to be transmitted over the downlink physical shared channel is generated, the UTRAN creates a $TFCI_{PDSCH}$ of the downlink physical shared channel and a frame of the downlink physical shared channel in step 1123. In step 1125, the UTRAN transmits the created $TFCI_{PDSCH}$ of the downlink physical shared channel and the created frame of the downlink physical shared channel at the preset transmission power higher than the normal transmission power. Thereafter, the UTRAN determines in step 1127 whether data to be transmitted at the next frame over the downlink physical shared channel is generated. If data to be transmitted over the downlink physical shared channel is generated, the UTRAN creates in step 1129 a $TFCI_{PDSCH}$ of the downlink physical shared channel and a frame of the downlink physical shared channel. In step 1131, the UTRAN transmits the created $TFCI_{PDSCH}$ of the downlink physical shared channel and the created frame of the downlink physical shared channel at the normal transmission power. However, if the data to be transmitted at the next frame over the downlink physical shared channel is not generated in step 1127, the UTRAN creates a frame of the downlink physical shared channel in step 1133. In step 1135, the UTRAN transmits the created downlink physical shared channel at the normal transmission power and at the same time, transmits/receives dedicated physical channel signals for one frame. In step 1137, the UTRAN determines again whether data to be transmitted at the next frame over the downlink physical shared channel is generated. If the data to be transmitted over the downlink physical shared channel is generated, the UTRAN creates a $TFCI_{PDSCH}$ of the downlink physical shared channel in step 1139. In step 1141, the UTRAN transmits the created $TFCI_{PDSCH}$ of the downlink physical shared channel at the normal transmission power, and then returns to step 1127. If, however, the data to be transmitted over the downlink physical shared channel is not generated in step 1137, the UTRAN transmits and receives dedicated physical channel signals for one frame in step 1143, and then returns to step 1137. The reason that the number of frames to be transmitted at the preset transmission power is 2 is because as stated above, the number (N) of TFCI frames of the downlink physical shared channel, to be transmitted at the increased transmission power, is 2.

In addition, if the data to be transmitted over the downlink physical shared channel is not generated in step 1121, the UTRAN creates a frame of the downlink physical shared channel in step 1145. In step 1147, the UTRAN transmits the created frame of the downlink physical shared channel at the preset transmission power and then proceeds to step 1137.

The gating end process by the UTRAN according to the gating end command of FIG. 10 has been described with reference to FIG. 11. Next, a gating end process by the UE according to the gating end command of FIG. 10 will be described with reference to FIG. 12.

Figure 12:
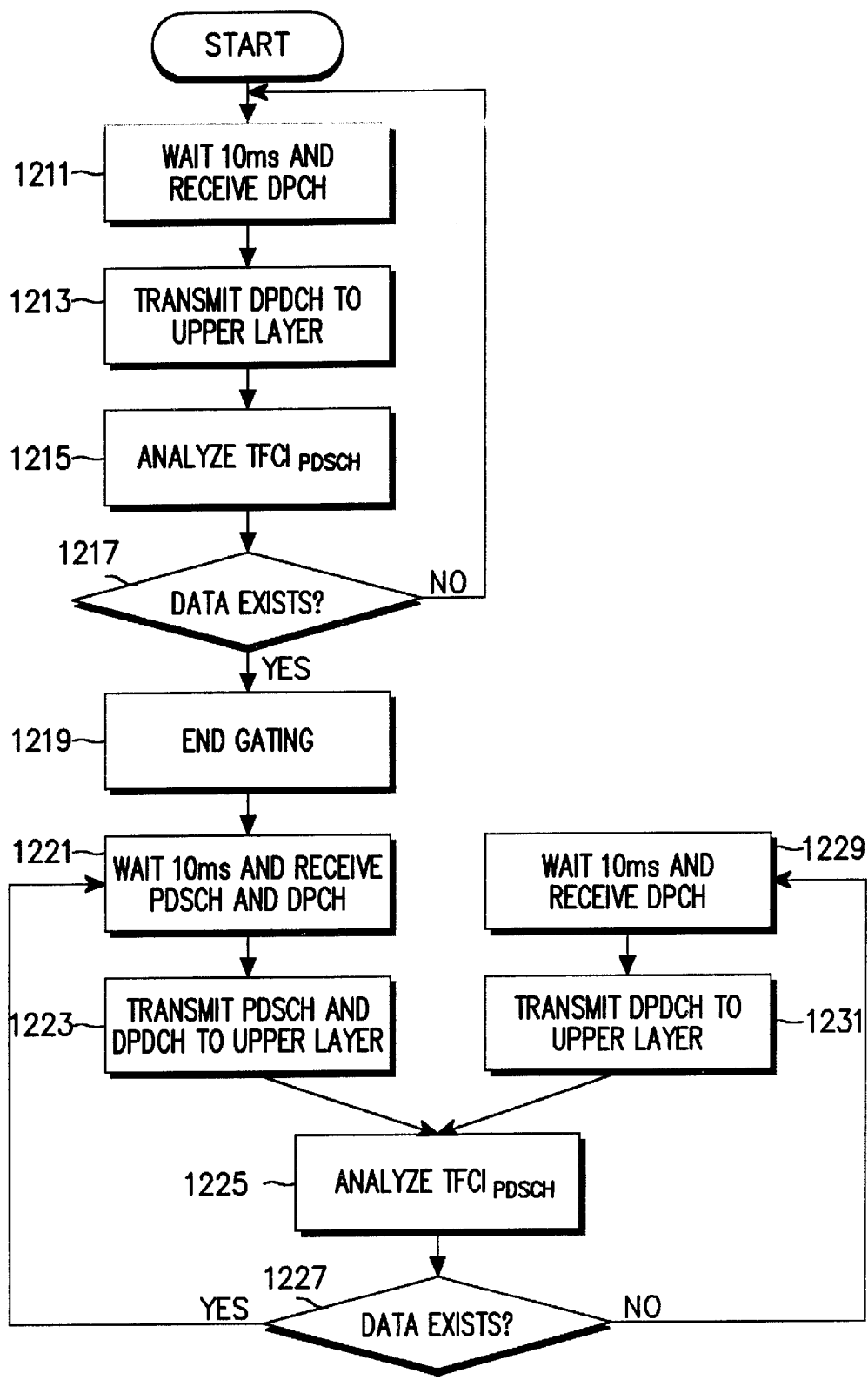
FIG. 12 is a flow chart illustrating a gating end process by a UE according to the gating end command of FIG. 10.

FIG. 12 is a flow chart illustrating a gating end process by a UE according to the gating end command of FIG. 10.

The UE receives a dedicated physical channel (DPCH) signal in step 1211, and transmits a dedicated physical data channel (DPDCH) to an upper layer in step 1213. Thereafter, in step 1215, the UE analyzes the $TFCI_{PDSCH}$ of the downlink physical shared channel received through the dedicated physical channel. In step 1217, the UE determines whether the analyzed $TFCI_{PDSCH}$ of the downlink physical shared channel indicates that there exists data in the next frame, to be received over the downlink physical shared channel. If there exists data to be received over the downlink physical shared channel, the UE proceeds to step 1219. Here, the $TFCI_{PDSCH}$ of the downlink physical shared channel includes the gating end command transmitted from the UTRAN, i.e., information indicating that there exists data in the next frame, to be received over the downlink physical shared channel. In step 1219, the UE ends the gating operation on the dedicated physical control channel. Thereafter, the UE receives the downlink physical shared channel and the dedicated physical channel in step 1221, and transmits the downlink physical shared channel and the dedicated physical data channel to the upper layer in step 1223. In step 1225, the UE analyzes the $TFCI_{PDSCH}$ of the downlink physical shared channel on the received dedicated physical channel. In step 1227, the UE determines whether the analyzed $TFCI_{PDSCH}$ of the downlink physical shared channel indicates that there exists data in the next frame, to be received over the downlink physical shared channel. If there exists data to be received over the downlink physical shared channel, the UE returns to step 1221. If there exists no data to be received over the downlink physical shared channel, the UE receives the dedicated physical channel in step 1229. In step 1231, the UE transmits the dedicated physical data channel to the upper layer and then proceeds to step 1225.

The gating end process according to the first embodiment of the present invention has been described with reference to FIGS. 10 to 12. Next, a gating end process according to a second embodiment of the present invention will be described with reference to FIGS. 13 to 15.

Figure 13:
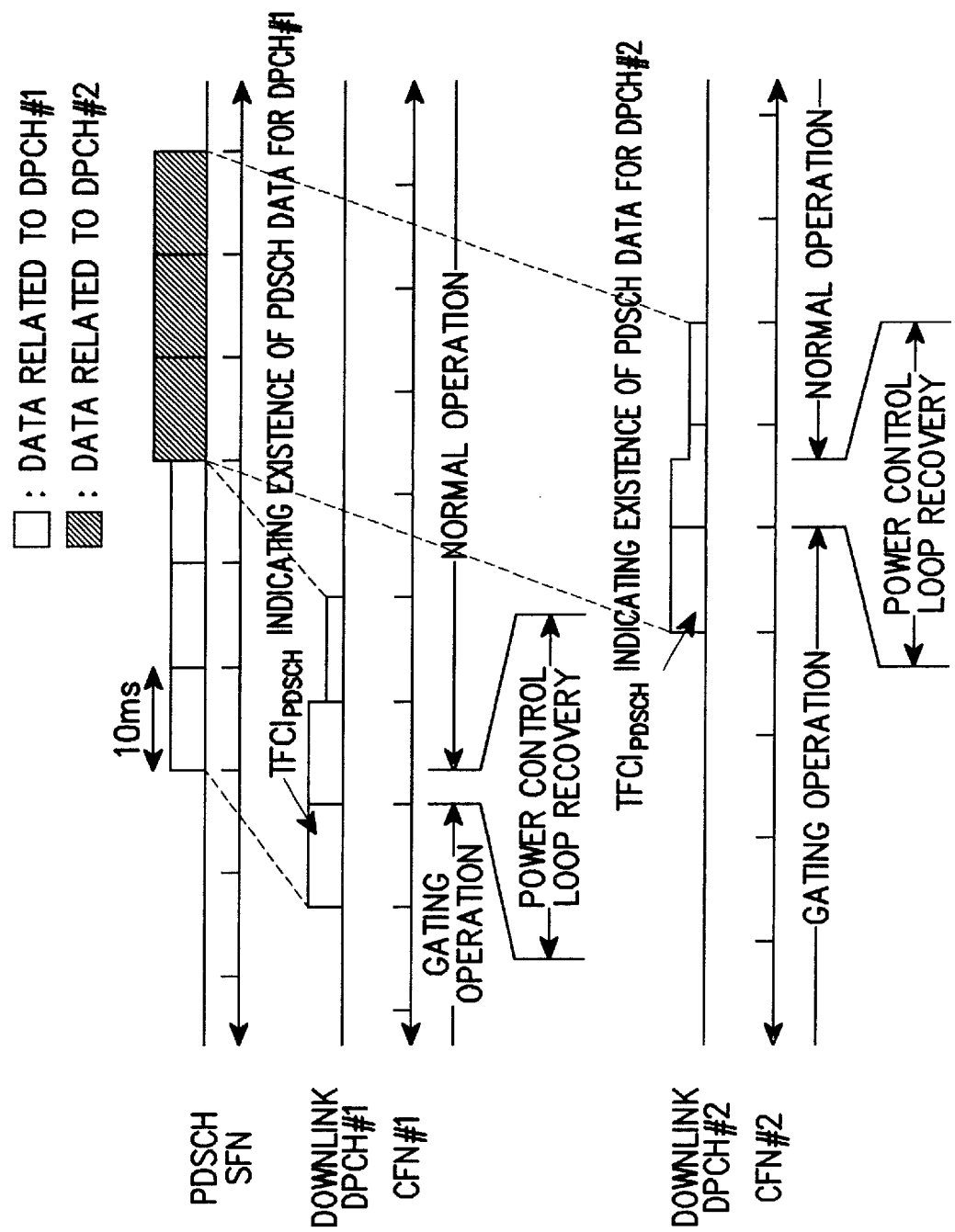
FIG. 13 is a diagram illustrating a gating end starting point of a dedicated physical control channel caused by a gating end command according to a second embodiment of the present invention.

FIG. 13 is a diagram illustrating a gating end starting point of a dedicated physical control channel caused by a gating end command according to a second embodiment of the present invention. Like the gating end process according to the first embodiment of the present invention described in FIG. 10, the gating end process according to the second embodiment of the present invention also ends the gating operation on the dedicated physical control channel upon receipt of a signal, i.e., a gating end command, indicating that there exists data to be received over the downlink physical shared channel, through the $TFCI_{PDSCH}$ of the downlink physical shared channel on the downlink dedicated physical channel. However, unlike the firs embodiment of the present invention, the second embodiment is not required to set the transmission power of the first downlink physical shared channel frame to be higher than the normal transmission power. That is, after transmitting the $TFCI_{PDSCH}$ of the first downlink physical shared channel, the second embodiment rapidly recovers a power control loop before the first downlink physical channel is transmitted, so that it is not necessary to increase the transmission power of the downlink physical shared channel. For the rapid recovery of the power control loop, the UTRAN and the UE set a power control step for the power control command to be higher in a power control loop recovery interval existing between a gating operation interval and a normal operation interval, than in the other interval, i.e., the gating operation interval and the normal operation interval. Here, the "power control step" refers to a step based on which the UTRAN and the UE change the throughput in response to the power control command in the power control loop recovery interval. The length of the power control loop recovery interval and the power control step in the power control loop recovery interval can be adaptively determined by the system according to the channel environment. It is possible to maintain the transmission power of the $TFCI_{PDSCH}$ of the second downlink physical shared channel to be higher than the normal transmission power either for one slot (see the $TFCI_{PDSCH}$ of the downlink physical shared channel for DPCH#1 shown in FIG. 13), or only in the power control loop recovery interval (see $TFCI_{PDSCH}$ of the downlink physical shared channel for DPCH#2 shown in FIG. 13).

A gating end process by the UTRAN according to the gating end command of FIG. 13 will be described with reference to FIG. 14.

Figure 14:
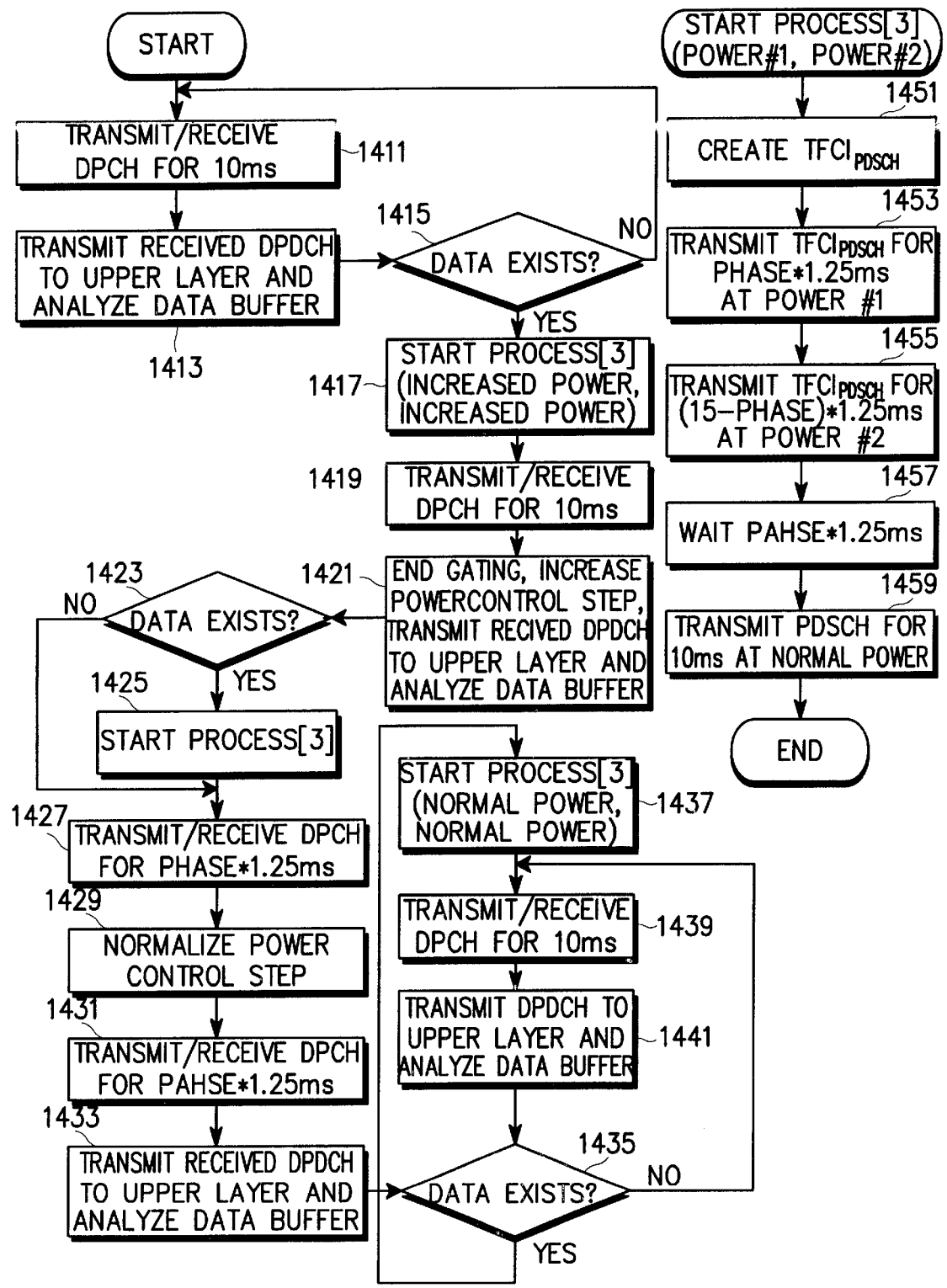
FIG. 14 is a flow chart illustrating a gating end process by a UTRAN according to a gating end command of FIG. 13.

FIG. 14 is a flow chart illustrating a gating end process by a UTRAN according to a gating end command of FIG. 13. In step 1411, the UTRAN performs a transmitting/receiving operation on the dedicated physical channel (DPCH) for 10 ms. In step 1413, the UTRAN transmits a dedicated physical data channel of the received dedicated physical channel to the upper layer. In step 1415, the UTRAN determines whether data to be transmitted at the next frame over the downlink physical shared channel is generated. If the data to be transmitted over the downlink physical shared channel is generated, the UTRAN starts a process [3] in step 1417. The process [3] is to transmit a transmission TFCI symbol at transmission power higher than the normal transmission power, thereby to decrease an error rate of the gating end command. Specifically describing the process [3], the UTRAN creates in step 1451 the $TFCI_{PDSCH}$ of the downlink physical shared channel, including a command indicating an end of the gating operation on the dedicated physical control channel. In step 1453, the UTRAN transmits the created $TFCI_{PDSCH}$ of the downlink physical shared channel at a first power level (Power#1) given at the start of the process [3]. Here, the time for which the $TFCI_{PDSCH}$ value is maintained corresponds to a time when a phase of the dedicated physical channel DPCH goes ahead a phase of the downlink physical shared channel PDSCH. This time value is a multiple of 1.25 ms and will be referred as "PHASE" hereinafter. After transmitting the $TFCI_{PDSCH}$ for PHASE*1.25 ms at Power#1, the UTRAN transmits the $TFCI_{PDSCH}$ at a second power level (Power#2) given at the start of the process [3] in step 1455. Here, the time for which the $TFCI_{PDSCH}$ is transmitted corresponds to 1.25 ms*(15−PHASE). After transmitting the $TFCI_{PDSCH}$ at Power#2, the UTRAN waits PHASE slots (1.25 ms) in step 1457, and then transmits the downlink physical shared channel at the normal transmission power in step 1459.

After starting the process [3], the UTRAN transmits and receives dedicated physical channel (DPCH) data for one frame (10 ms) in step 1419. Thereafter, in step 1421, the UTRAN ends the gating operation on the dedicated physical control channel, increases the power control step and then transmits the dedicated physical data channel received from the UE to the upper layer. Further, the UTRAN analyzes the contents of a buffer in which the data provided from the upper layer is stored. In step 1423, the UTRAN determines whether there exists data to be transmitted at the next frame over the downlink physical shared channel. If there exists data to be transmitted over the downlink physical shared channel, the UTRAN starts in step 1425 the process [3] where Power#1 is set to the increased power and Power#2 is set to the normal power. After starting the process [3], the UTRAN transmits and receives the dedicated physical channel data at the increased power for PHASE slots in step 1427. The UTRAN normalizes the power control step in step 1429, and transmits and receives the dedicated physical channel data at the normal transmission power for the remaining slots of one frame in step 1431. Thereafter, in step 1433, the UTRAN transmits data on the received dedicated physical data channel to the upper layer. In step 1435, the UTRAN determines whether data to be transmitted at the next frame over the downlink physical shared channel is generated. If the data to be transmitted over the downlink physical shared channel is generated, the UTRAN starts in step 1437 the process [3] where Power#1 is set to the normal power and Power#2 is also set to the normal power. In step 1439, the UTRAN transmits and receives the dedicated physical channel data for one frame. In step 1441, the UTRAN transmits data on the received dedicated physical data channel to the upper layer and then analyzes the buffer where the data provided from the upper layer is stored.

In addition, a gating end process by the UE according to the gating end command of FIG. 13 will be described with reference to FIG. 15.

Figure 15:
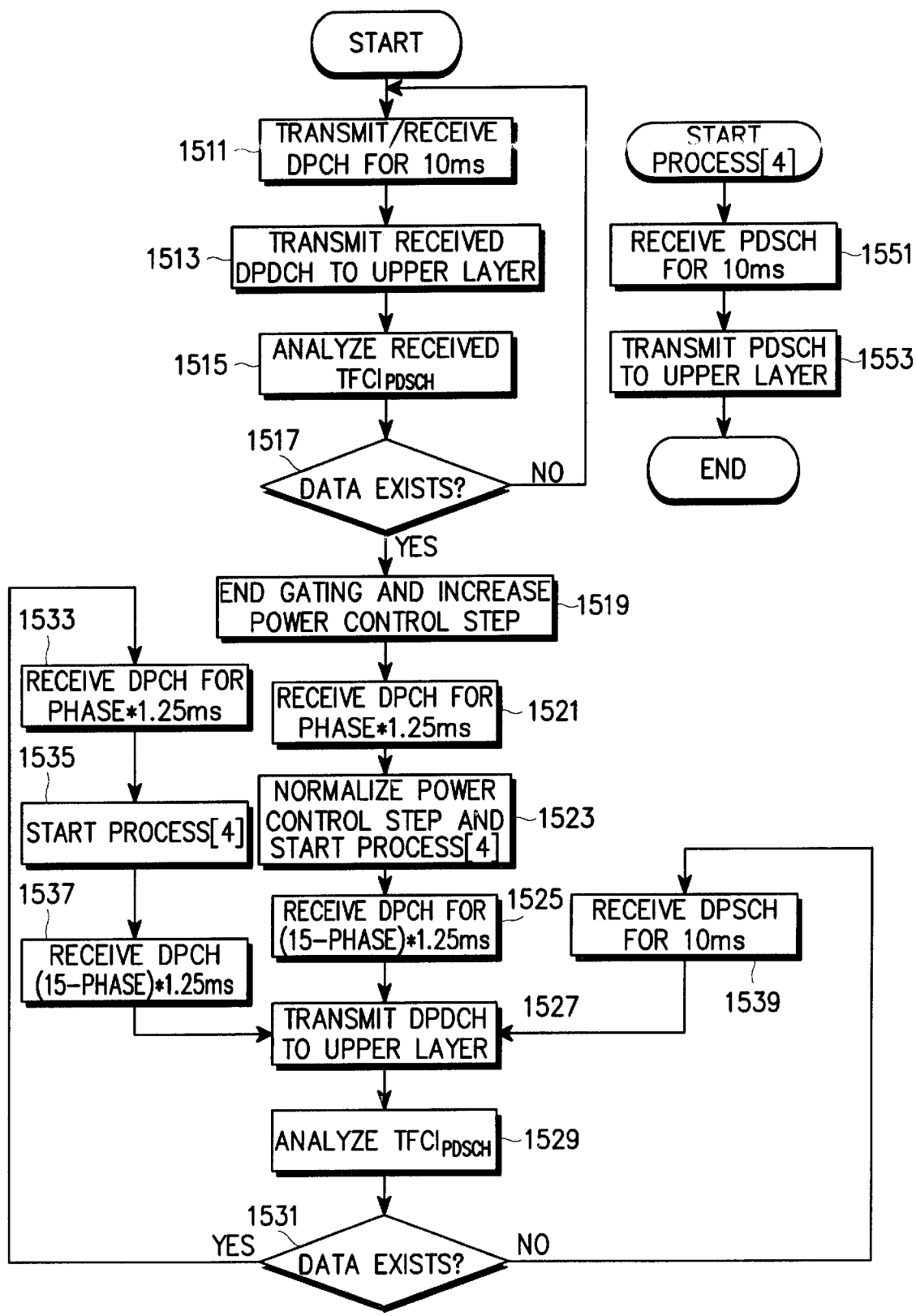
FIG. 15 is a flow chart illustrating a gating end process by a UE according to a gating end command of FIG. 13.

FIG. 15 is a flow chart illustrating a gating end process by a UE according to a gating end command of FIG. 13. In step 1511, the UE transmits and receives the dedicated physical channel (DPCH) signals for one frame (10 ms). In step 1513, the UE transmits data on the received dedicated physical data channel to the upper layer. In step 1515, the UE analyzes the $TFCI_{PDSCH}$ of the downlink physical shared channel. In step 1517, the UE determines whether the analyzed $TFCI_{PDSCH}$ of the downlink physical shared channel indicates that there exists data to be received at the next frame over the downlink physical shared channel. If there exists data to be received at the next frame over the downlink physical shared channel, the UE ends the gating operation on the dedicated physical control channel and then increases the power control step, in step 1519. Thereafter, in step 1521, the UE receives the dedicated physical channel data for PHASE slots. In step 1523, the UE normalizes the power control step and then starts a process [4]. Specifically describing the process [4], the UE receives the downlink physical shared channel PDSCH for one frame in step 1551 and then transmits the received downlink physical shared channel to the upper layer in step 1553.

After starting the process [4], the UE receives the dedicated physical channel for the (15-PHASE) remaining slots in step 1525, and then transmits the dedicated physical data channel of the received dedicated physical channel to the upper layer in step 1527. Thereafter, the UE analyzes the $TFCI_{PDSCH}$ of the received downlink physical shared channel in step 1529, and then determines in step 1531 whether the analyzed $TFCI_{PDSCH}$ of the downlink physical shared channel indicates that there exists data to be received at the next frame over the downlink physical shared channel. If there exists data to be received at the next frame over the downlink physical shared channel, the UE receives the dedicated physical channel for PHASE slots in step 1533 and then starts the process [4] in step 1535. Thereafter, in step 1537, the UE receives the dedicated physical channel for the remaining slots, i.e., (15-PHASE) slots, and then proceeds to step 1527. However, if there exists no data to be received at the next frame over the downlink physical shared channel in step 1531, the UE receives the dedicated physical channel for one frame in step 1539 and then proceeds to step 1527.

The gating end process according to the second embodiment of the present invention has been described with reference to FIGS. 13 to 15. Next, a gating end process according to a third embodiment of the present invention will be described with reference to FIGS. 16 to 19.

Figure 16:
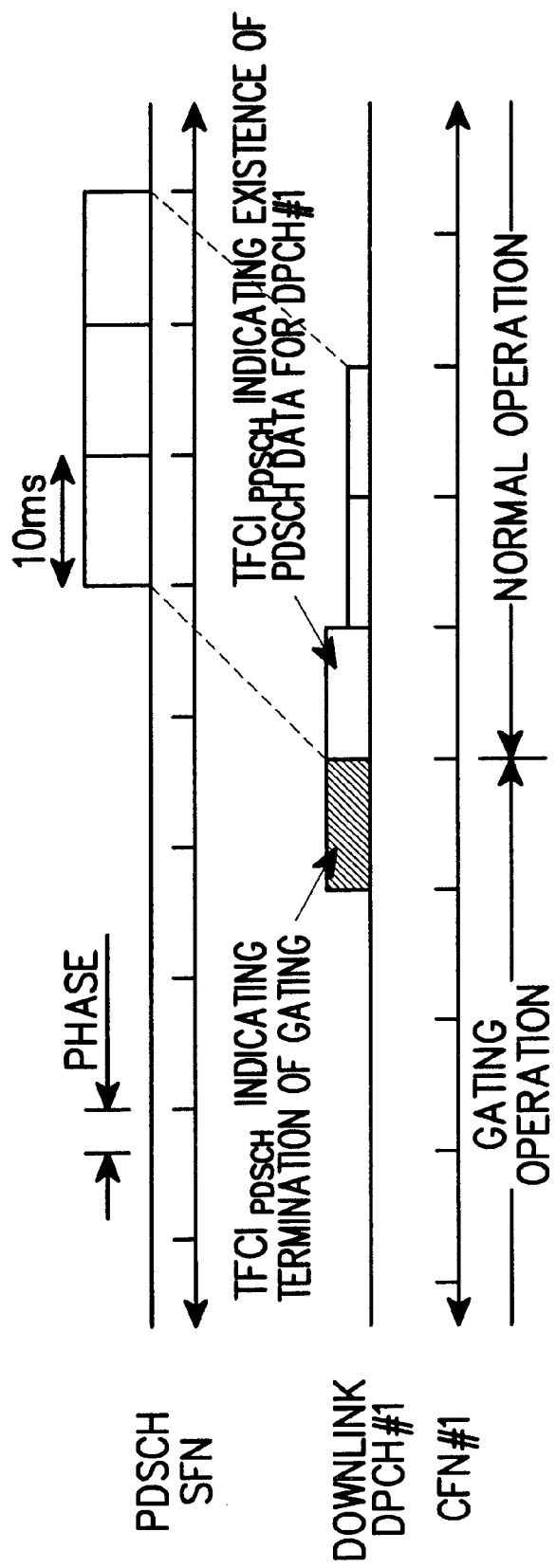
FIG. 16 is a diagram illustrating a gating end starting point of a dedicated physical control channel caused by a gating end command according to a third embodiment of the present invention.

FIG. 16 is a diagram illustrating a gating end starting point of a dedicated physical control channel caused by a gating end command according to a third embodiment of the present invention. As illustrated in FIG. 16, a specific value among the $TFCI_{PDSCH}$ of the downlink physical shared channel on the downlink dedicated physical channel is defined as a gating end command for ending the gating operation on the dedicated physical control channel. If the UTRAN transmits the gating end command to the UE as many times as a preset number N, before transmitting data over the downlink physical shared channel, the UE ends the gating operation on the dedicated physical control channel upon receipt of the gating end command. When the UTRAN ends the gating operation on the dedicated physical control channel beginning at the next frame after transmitting the gating end command, it is possible to prevent the unstable initial power control which occurs during the data transmission through the downlink physical shared channel. Here, the $TFCI_{PDSCH}$ of the downlink physical shared channel transmitted to the UE to issue a command to end the gating operation has transmission power higher than the normal transmission power so as to maintain an error occurrence rate to a proper level. FIG. 16 shows an exemplary method for transmitting data over the downlink physical shared channel after ending the gating operation when the preset number is N=1.

As shown in FIG. 16, the gating end process according to the third embodiment of the present invention is advantageous in that it is possible to prevent the unstable initial power control. However, when the gating end command fails to be normally transmitted to the UE due to the transmission error, reliability of the gating end operation is decreased. A gating end starting point for overcoming the gating end command error will be described with reference to FIG. 17.

Figure 17:
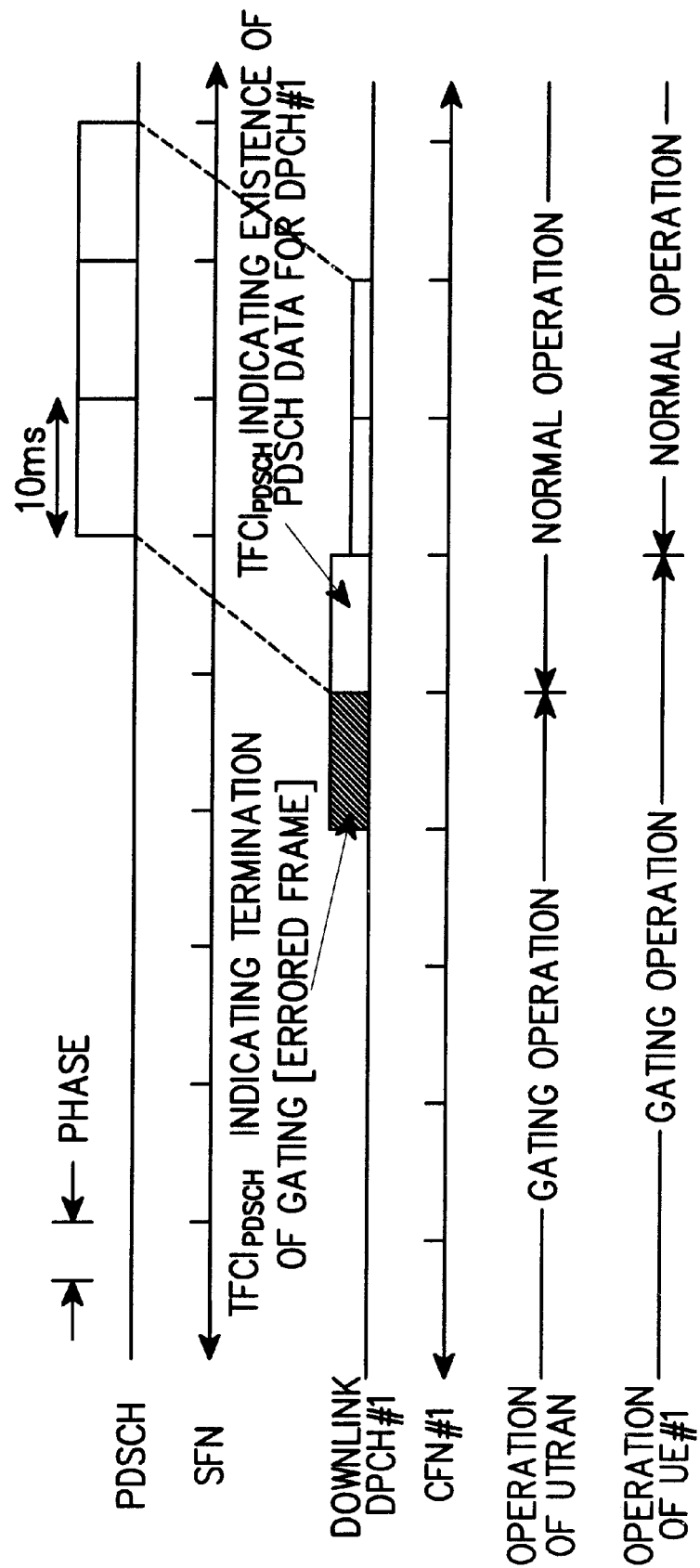
FIG. 17 is a diagram illustrating a gating end starting point of a dedicated physical control channel for overcoming a gating end command error occurred in FIG. 16.

FIG. 17 is a diagram illustrating a gating end starting point of a dedicated physical control channel for overcoming a gating end command error occurred in FIG. 16. As stated above, even though the UE fails to receive the gating end command due to the gating end command error, if it is analyzed by the UE that data has been transmitted to the UE itself through the downlink physical shared channel, then the UE immediately ends the gating operation on the dedicated physical control channel and then performs the normal operation until a separate gating end command is received. FIG. 17 shows an error overcoming process for overcoming the gating-related state inconsistency by the UE and the UTRAN, when the preset number is N=1 and the gating end commands are all missing.

A gating end process by the UTRAN according to the gating end command of FIG. 16 will be described below with reference to FIG. 18.

Figure 18:
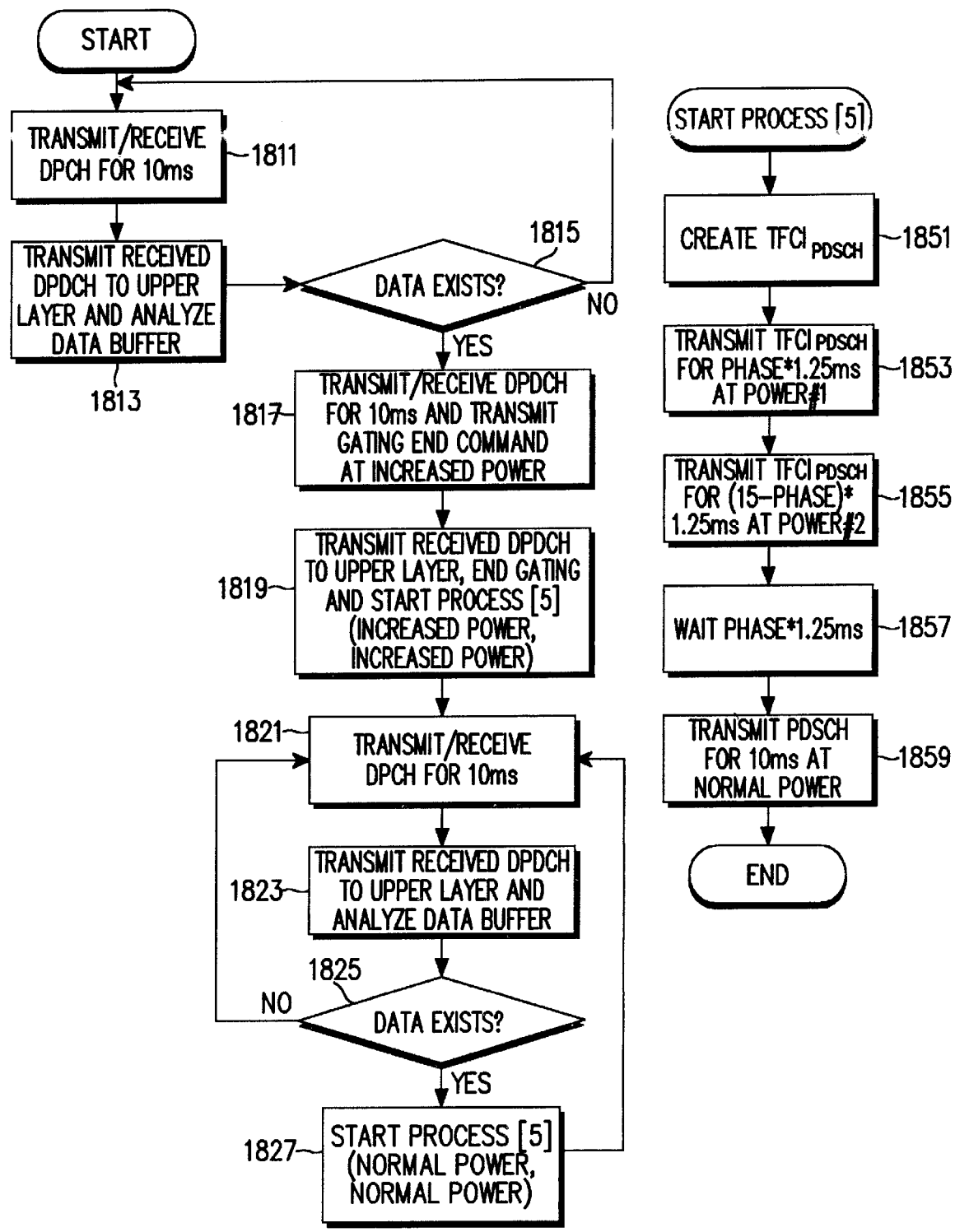
FIG. 18 is a flow chart illustrating a gating end process by a UTRAN according to the gating end command of FIG. 16.

FIG. 18 is a flow chart illustrating a gating end process by a UTRAN according to the gating end command of FIG. 16. In step 1811, the UTRAN transmits and receives the dedicated physical channel (DPCH) signals for one frame (10 ms). In step 1813, the UTRAN transmits the dedicated physical data channel of the received dedicated physical channel to the upper layer. In step 1815, the UTRAN determines whether there exists data to be transmitted at the next frame over the downlink physical shared channel. If there exists the data to be transmitted, the UTRAN transmits and receives the dedicated physical channel (DPCH) signals for one frame, creates a gating end command, and then transmits the $TFCI_{PDSCH}$ of the downlink physical shared channel, in which the created gating end command is included, in step 1817. Here, the $TFCI_{PDSCH}$ of the downlink physical shared channel, in which the gating end command is included, is transmitted at preset transmission power higher than the normal transmission power. In step 1819, the UTRAN transmits the received dedicated physical data channel to the upper layer, ends the gating operation, and then starts a process [5] where Power#1 is set to the increased power and Power#2 is also set to the increased power.

Specifically describing the process [5], the UTRAN creates the $TFCI_{PDSCH}$ of the downlink physical shared channel in step 1851, and transmits 30 the created $TFCI_{PDSCH}$ of the downlink physical shared channel for PHASE slots at Power#1 in step 1853. Thereafter, in step 1855, the UTRAN transmits the $TFCI_{PDSCH}$ of the downlink physical shared channel for (15-PHASE) slots of the frame at Power#2. The UTRAN waits PHASE slots in step 1857, and then transmits the downlink physical shared channel for one frame at the normal transmission power in step 1859.

Thereafter, the UTRAN transmits and receives the dedicated physical channel DPCH for one frame in step 1821, and transmits data on the dedicated physical data channel of the received dedicated physical channel to the upper layer in step 1823. The UTRAN determines in step 1825 whether there exists data to be transmitted at the next frame over the downlink physical shared channel. If there exists data to be transmitted over the downlink physical shared channel, the UTRAN starts in step 1827 the process [5] where Power#1 is set to the normal transmission power and Power#2 is also set to the normal transmission power. In the process [5] of step 1827, the UTRAN transmits the $TFCI_{PDSCH}$ of the downlink physical shared channel for the preset slots at the normal transmission power in step 1853, and also transmits the $TFCI_{PDSCH}$ of the downlink physical shared channel for the slots other than the preset slots at the normal transmission power even in step 1855.

Next, a gating end process by the UE according to the gating end command. If FIG. 16 will be described with reference to FIG. 19.

Figure 19:
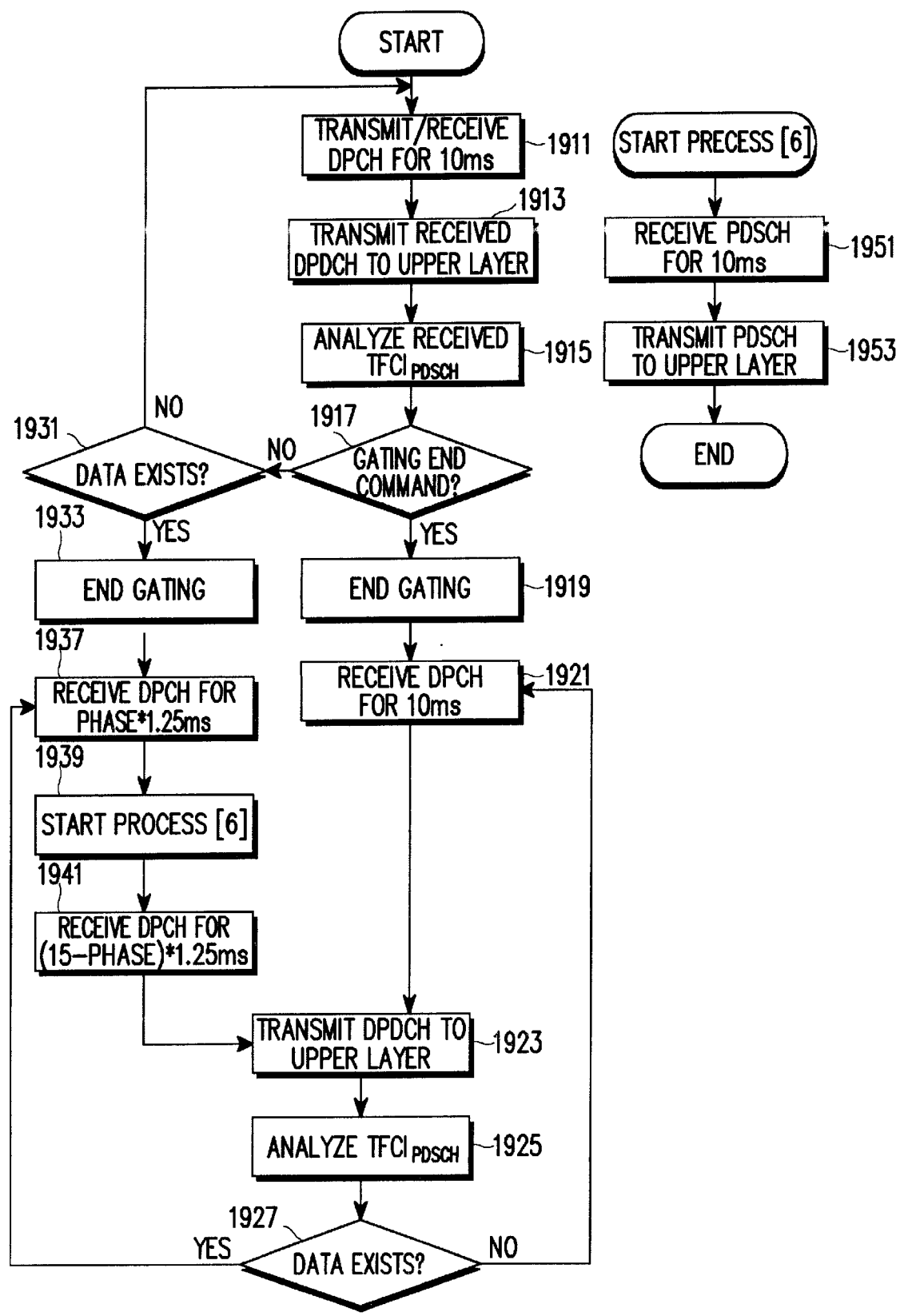
FIG. 19 is a flow chart illustrating a gating end process by a UE according to the gating end command of FIG. 16.

FIG. 19 is a flow chart illustrating a gating end process by a UE according to the gating end command of FIG. 16. In step 1911, the UE transmits and receives the dedicated physical channel (DPCH) signals for one frame (10 ms). In step 1913, the UE transmits data on the dedicated physical data channel of the received dedicated physical channel to the upper layer. In step 1915, the UE analyzes the $TFCI_{PDSCH}$ of the downlink physical shared channel on the received dedicated physical channel. In step 1917, the UE determines whether the analyzed $TFCI_{PDSCH}$ of the downlink physical shared channel indicates a gating end command. If the analyzed $TFCI_{PDSCH}$ indicates the gating end command, the UE ends the gating operation on the dedicated physical control channel in step 1919. Thereafter, in step 1921, the UE receives the dedicated physical channel (DPCH) data for one frame. In step 1923, the UE transmits data on the dedicated physical data channel on the received dedicated physical channel to the upper layer. In step 1925, the UE analyzes the $TFCI_{PDSCH}$ of the downlink physical shared channel on the received dedicated physical channel. In step 1927, the UE determines whether the analyzed $TFCI_{PDSCH}$ of the downlink physical shared channel indicates that there exists data to be received at the next frame over the downlink physical shared channel. If there exists data to be received at the next frame over the downlink physical shared channel, the UE receives the dedicated physical channel signal for preset slots in step 1937. In step 1939, the UE starts a process [6].

Specifically describing the process [6], the UE receives the downlink physical shared channel (PDSCH) signal for one frame in step 1951, and then transmits the received downlink physical shared channel signal to the upper layer in step 1953.

After starting the process [6] in step 1939, the UE receives the dedicated physical channel data again for the slots other than the preset slots, i.e., (15-PHASE) slots in step 1941, and then proceeds to step 1923.

Meanwhile, even though the $TFCI_{PDSCH}$ of the downlink physical shared channel, in which the gating end command transmitted from the UTRAN is included, is missing, if it is determined in step 1931 that there exists data to be received at the next frame over the downlink physical shared channel, the UE ends the gating operation on the dedicated physical control channel in step 1933.

Further, it is also possible to end the gating operation in a method for transmitting a command to end the gating operation on the dedicated physical control channel, using a message capable of changing the characteristic of the physical channel among the upper layer control messages. In this case, the UTRAN transmits a Layer-3 control message including a gating end command and its execution time to the UE, and the UE then transmits to the UTRAN a response signal indicating that the Layer-3 control message has been normally received, so that the UTRAN and the UE end the gating operation.

Meanwhile, in order to prevent quality deterioration of the dedicated physical data channel by maintaining the close relationship between the quality of the dedicated physical data channel and the transmission power of the dedicated physical data channel during the gating operation on the dedicated physical control channel, the transmission power of the dedicated physical data channel is increased compared with the normal transmission power before the gating operation. That is, the transmission power of the dedicated physical data channel must be increased such that the frame error rage (FER) in the gating operation interval should be maintained to be equal to the frame error rate before the gating operation.

In the above-stated embodiments, when the UTRAN determines to end the gating operation and transmits $TFCI_{PDSCH}$ including a gating end command to the UE, the UE then ends the gating operation upon receipt of the $TFCI_{PDSCH}$.

The invention has described with reference to the embodiments where the UE performs the gating end operation upon receipt of the gating end command from the UE during the gating operation. Next, a method for transmitting a gating end request from the UE to the UTRAN will be described with reference to FIG. 20.

Figure 20:
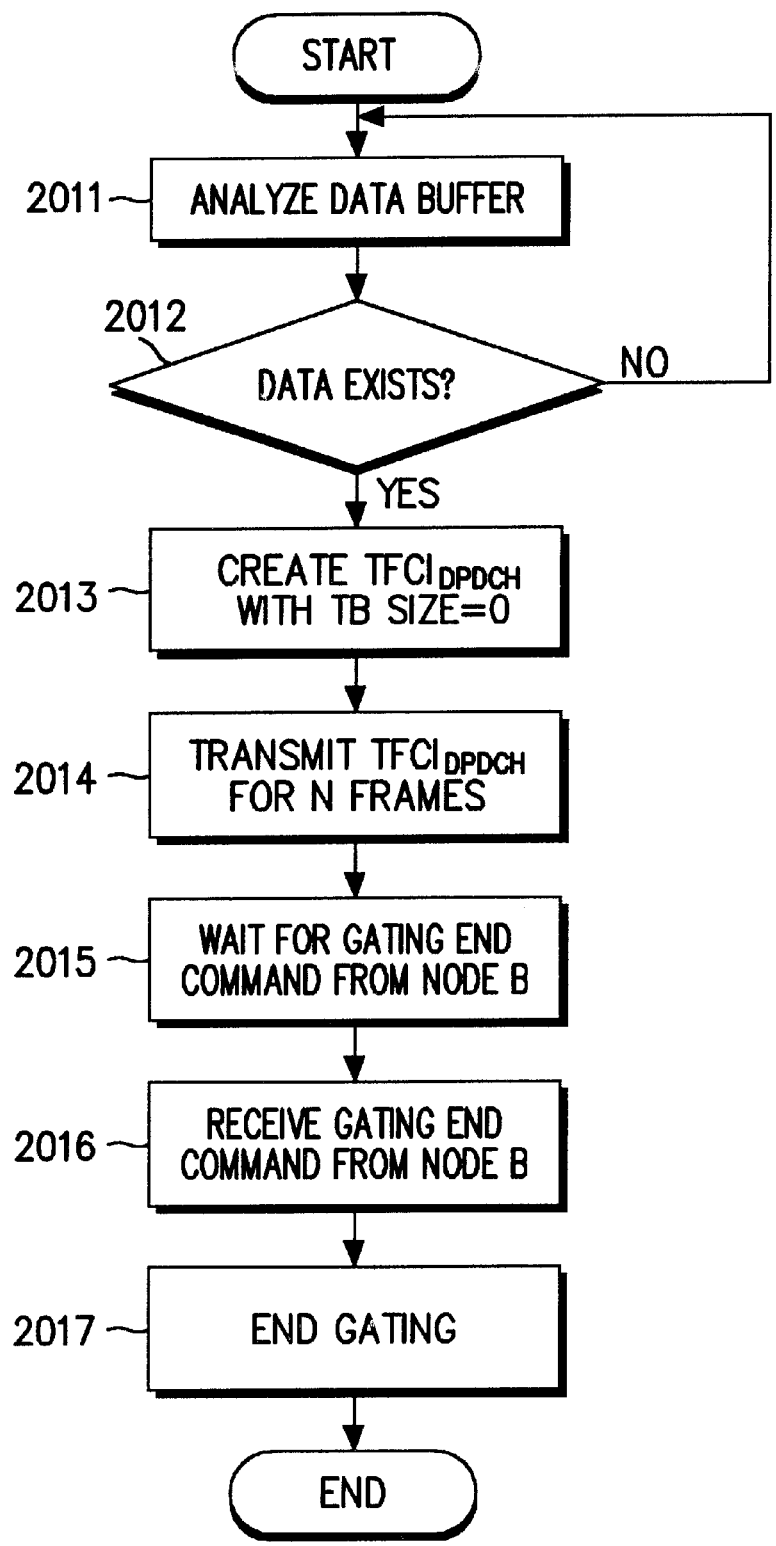
FIG. 20 is a flow chart illustrating a gating end request process by a UE according to another embodiment of the present invention.

FIG. 20 is a flow chart illustrating a gating end request process by a UE according to another embodiment of the present invention. If the UE is gating the dedicated physical control channel, i.e., if Gating_Started=1, the UE analyzes a data buffer in step 2011. The UE determines in step 2012 whether there exists data to be transmitted over the uplink physical data channel DPDCH. If there exists data to be transmitted over the uplink physical data channel, the UE creates, in step 2013, $TFCI_{DPDCH}$ of which transport block (TB) number is not '0' and the transport block size is '0'. In step 2014, the UE repeatedly transmits the created $TFCI_{DPDCH}$ of which transport block (TB) number is not '0' and the transport block size is '0', to the UTRAN over the uplink physical control channel for N frames. Here, the reason that the UE repeatedly transmits the created $TFCI_{DPDCH}$ to the UTRAN over the uplink physical control channel for N frames is to request an end of the gating operation since the UE has data to transmit. After transmitting the created $TFCI_{DPDCH}$, the UE waits for a gating end command to be received from the UTRAN in step 2015.

Meanwhile, upon receipt of the $TFCI_{DPDCH}$, of which the transport block size is '0', from the UE, the UTRAN transmits a gating end command to the UE and also ends its gating operation to receive data from the UE, even though there exists no data to transmit to the UE over the downlink physical channel and the downlink shared channel. Thus, the UE receives the gating end command from the UTRAN in step 2016 and ends the gating operation on the dedicated physical control channel in step 2017. Here, the UTRAN temporarily transmits the $TFCI_{PDSCH}$ including the gating end command to the UE, so that the UE the UTRAN end the gating operation. The gating end request from the UE to the UTRAN can be performed using either the TFCI as described in FIG. 20, or a signaling message from the upper layer. In addition, when the UTRAN in the gating operation continuously transmits the TFCI including the gating start command over the downlink shared channel DSCH during the gating operation, the UE may also end the gating operation upon receipt of another TFCI excepting the TFCI including the gating start command.

A method for ending the gating operation in the UTRAN will be described with reference to FIG. 21.

Figure 21:
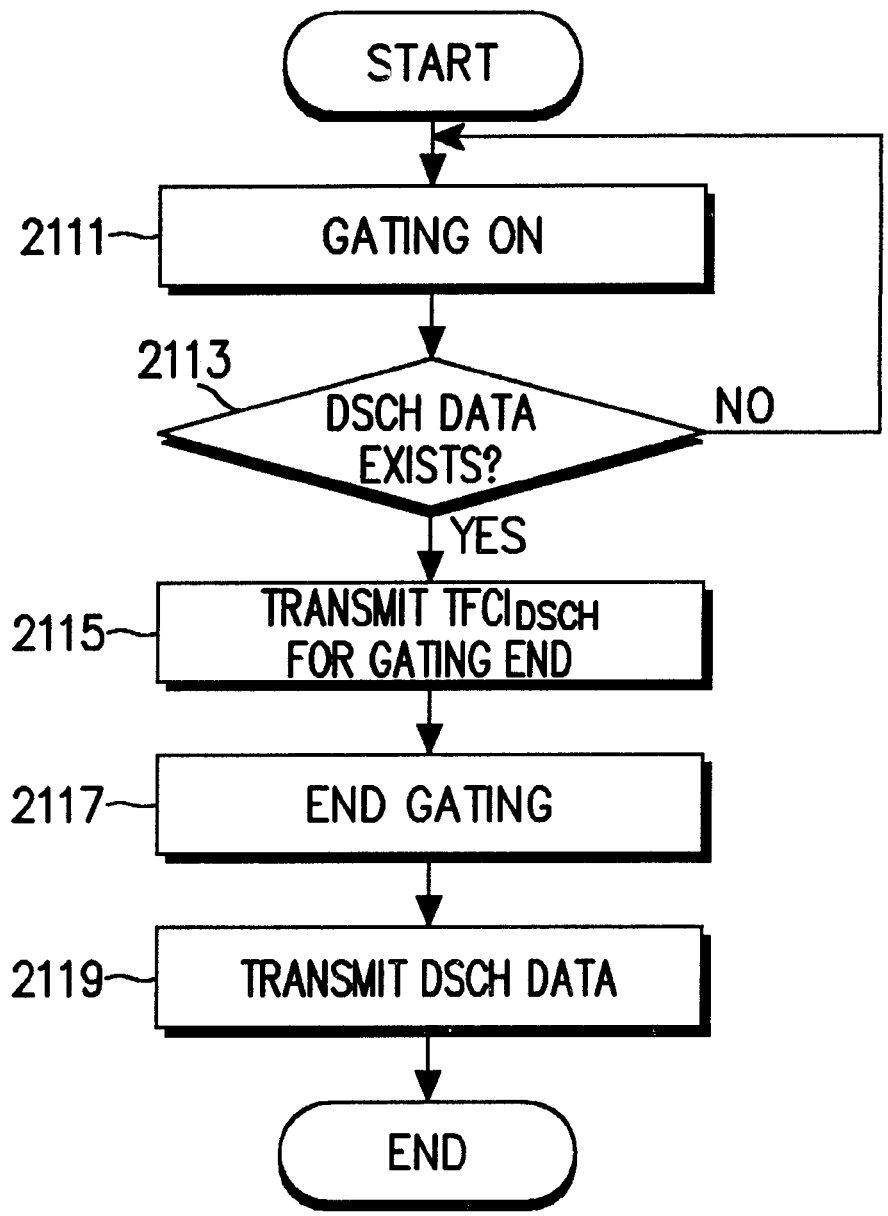
FIG. 21 is a flow chart illustrating a gating end process by a UTRAN according to another embodiment of the present invention.

FIG. 21 is a flow chart illustrating a gating end process by a UTRAN according to another embodiment of the present invention.

The UTRAN, which is currently performing a gating operation on the dedicated physical control channel in step 2111, determines in step 2113 whether downlink shared channel (DSCH) data to be transmitted to the UE is generated. If the data is generated, the UTRAN creates a $TFCI_{DSCH}$ for the data to be transmitted over the downlink shared channel (DSCH) and transmits the created $TFCI_{DSCH}$ to the UE in step 2115. Here, in order to transmit data over the downlink shared channel DSCH, the UTRAN creates the $TFCI_{DSCH}$ defined as a gating end command, for example, creates a TFCI with TB size=0, and transmits the created TFCI. Thereafter, the UTRAN ends the gating operation in step 2117. After ending the gating operation on the dedicated physical control channel, the UTRAN transmits the $TFCI_{DSCH}$ to the UE and then transmits data over the downlink shared channel DSCH in step 2119.

A gating end operation by the UE corresponding to the gating end operation by the UTRAN described in FIG. 21 will be described with reference to FIG. 22.

Figure 22:
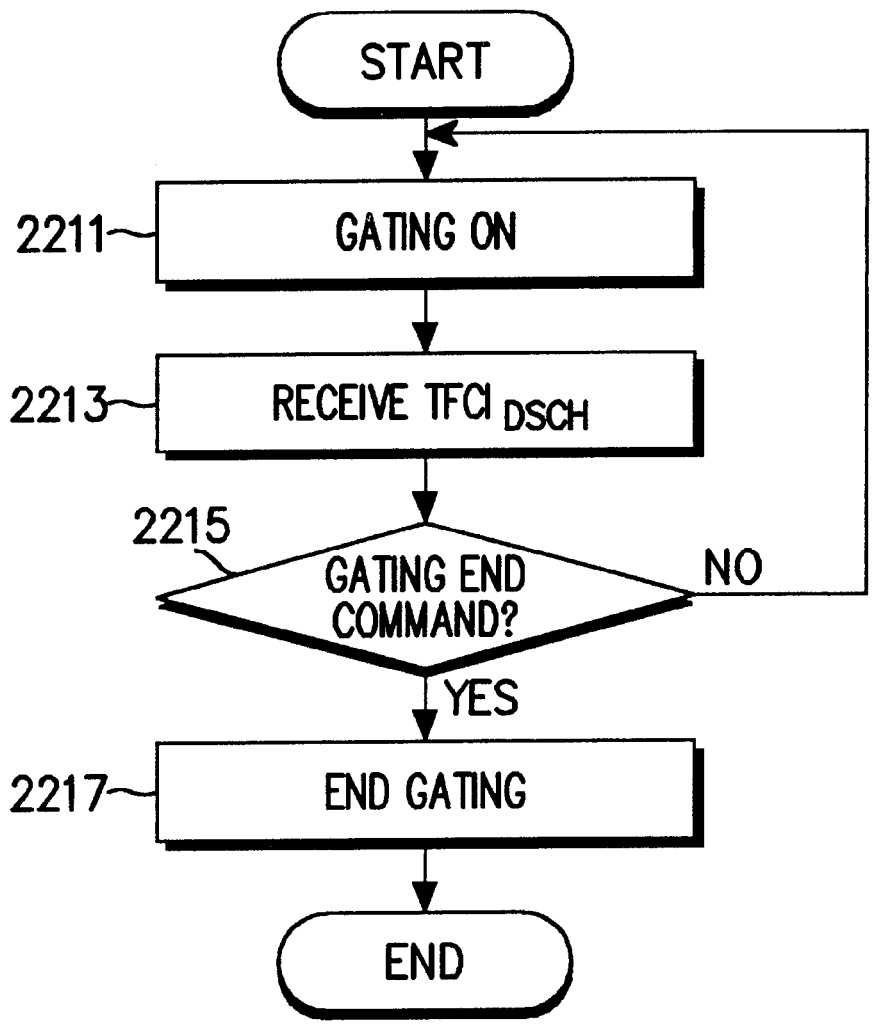
FIG. 22 is a flow chart illustrating a gating end process by a UE corresponding to the gating end process by the UTRAN of FIG. 21.

FIG. 22 is a flow chart illustrating a gating end process by a UE according to another embodiment of the present invention. The UE performs a gating operation on the dedicated physical control channel in step 2211, and then receives the $TFCI_{DSCH}$ of the downlink shared channel DSCH in step 2213. The UE analyzes the received $TFCI_{DSCH}$ bit and determines in step 2215 whether a gating end command is included in the $TFCI_{DSCH}$ bit. If the gating end command is included in the $TFCI_{DSCH}$ bit, the UE ends the gating operation on the dedicated physical control channel and then prepares to receive data over the downlink shared channel DSCH in step 2217. Here, the TFCI bit including the gating end command becomes the $TFCI_{DSCH}$ of which transport block (BT) number is not '0' but the transport block size is '0'.

The gating start/end state transition according to an embodiment of the present invention will be described with reference to FIG. 23.

Figure 23:
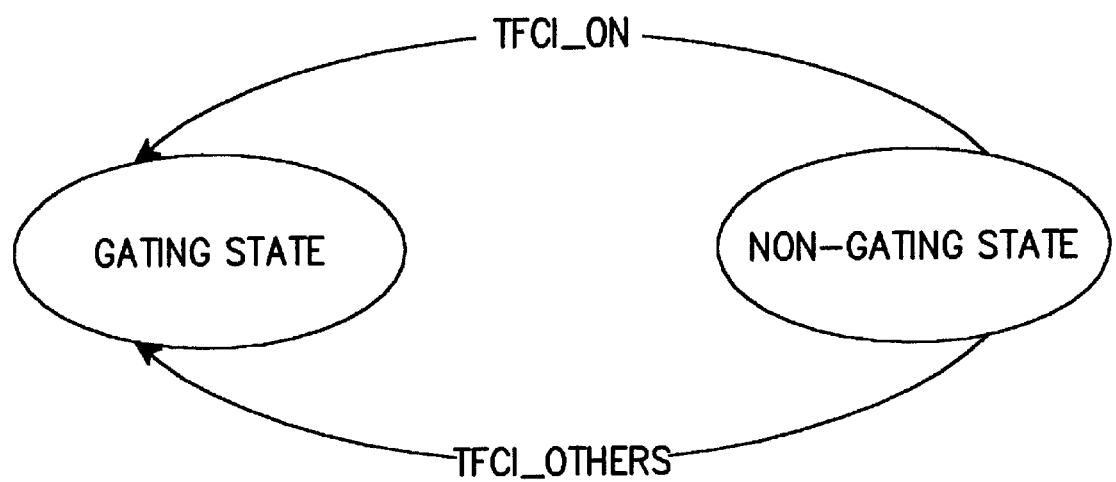
FIG. 23 is a gating start/end state transition diagram according to an embodiment of the present invention.

FIG. 23 is a gating start/end state transition diagram according to an embodiment of the present invention, wherein TFCI_on is defined as a gating start indicator, i.e., as a gating start command, and TFCI_others is defined as a TFCI other than the gating start indicator. The TFCI_on can be defined as either a $TFCI_{PDSCH}$ of which the transport block number is not '0' but the transport block size is '0', or a maximum value $TFCI_{MAX}$ or a minimum value $TFCI_{MIN}$ of the TFCI. On the other hand, the TFCI_others ends the gating operation and transmits the $TFCI_{PDSCH}$ for data transmission to perform data transmission when there exists data to be transmitted over the downlink shared channel DSCH, and the TFCI_others can define the TFCI with the TB number=0 as either a gating end indicator, i.e., a gating end command, or a maximum value $TFCI_{MAX}-1$ or a minimum value $TFCI_{MIN}+1$ of the TFCI, when the gating operation should be ended even though there exists no data to be transmitted over the downlink shared channel DSCH.

Figure 24:
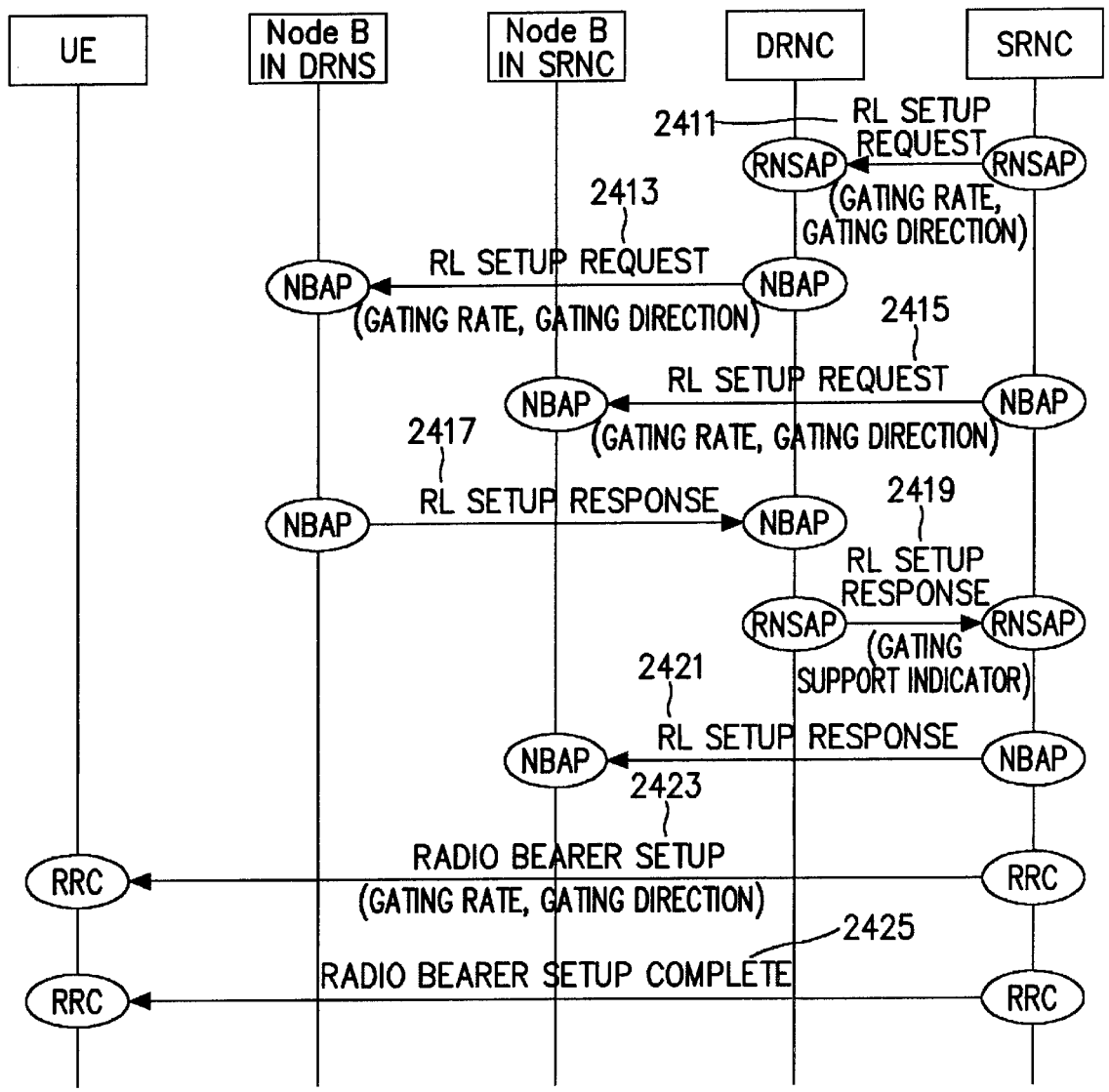
FIG. 24 is a signal flow diagram illustrating a radio link setup process during a gating start operation according to another embodiment of the present invention.

FIG. 24 is a signal flow diagram illustrating a radio link setup process during a gating start operation according to another embodiment of the present invention. Specifically, FIG. 24 is a signal flow diagram illustrating a process for setting up gating parameters among a radio network controller (RNC), a UTRAN (hereinafter, referred to as a "Node B"), and a UE.

When a Control CRN (CRNC) sets up a cell, the CRNC sends a Cell Setup Request message with a gating indicator. However, if a Node B that has received the Cell Setup Request message does not support the gating operation, the Node B sends the CRNC a Cell Setup Failure message including as a gating failure cause an indicator gating_not_supported indicating that the gating operation is not supported. When the Node B supports the gating operation, the Node B sends the CRNC a Cell Setup Response message indicating that the Node B can perform the gating operation, in response to the Cell Setup Request message, and the CRNC then stores information indicating that the Node B can support the gating operation. A UE sends the SRNC an RRC Connection Setup Confirm message with a gating support indicator included in a UE capability information group. Upon receipt of the RRC Connection Setup Confirm message, the SRNC stores information indicating that it can start the gating operation during data communication with the UE.

When both the Node B and the UE can support the gating operation, a radio link setup process for a gating start operation is required. A gating initialization operation during the radio link setup will be described with reference to FIG. 24. When a Serving RNC (SRNC) sets up a radio link, the SRNC sends the Node B a Radio Link Setup Request message or a Radio Link Addition Request message, both of which are NBAP/RNSAP messages, together with gating parameters. Upon receipt of the message, the Node B stores the gating parameters included in the Radio Link Setup Request message or the Radio Link Addition Request message, and uses the stored gating parameters when starting the gating operation. In addition, a DRNC (Drift RNC) can also send the SRNC an indicator indicating whether it supports the gating operation, as a part of the neighboring cell information, and the SRNC stores the information. However, if any one of the cells having radio links to the UE does not support the gating operation, the SRNC ends the gating operation and does not start a new gating operation.

As illustrated in FIG. 24, in step 2411, the SRNC sends the DRNC a Radio Link (RL) Setup Request message including a gating rate and a gating direction, when setting up a radio link through the DRNC. Then, in step 2413, the DRNC sends a Node B an RL Setup Request message being an NBAP message so as to request the Node B to set up a radio link. In step 2415, the SRNC also sends a Node B belonging thereto an RL Setup Request message being an NBAP message so as to request the Node B to set up a radio link. Then, in step 2417, upon receipt of the NBAP message from the DRNC, the Node B assigns resources, stores the gating parameters, and sends an RL Setup Response message to the DRNC to indicate that the radio link is set up. In step 2419, upon receipt of the RL Setup Response message, the DRNC informs the SRNC that the radio link is set up, and can also send a gating support indicator indicating whether the neighboring cells support the gating operation. In step 2421, the Node B belonging to the SRNC assigns the resources, stores the gating parameters, and sends an RL Setup Response message thereby to inform the SRNC that the radio link is set up. In step 2423, the SRNC sends the UE a Radio Bearer Setup message including such gating parameters as a gating rate and a gating direction. In step 2425, the UE stores the gating parameters received from the SRNC, and transmits a Radio Bearer Setup Complete message to the SRNC thereby to indicate that a radio bearer is setup.

Meanwhile, there are three methods for starting and ending the gating operation according to an embodiment of the present invention, as follows:

(1) a method using an RNSAP/NBAP signaling message and an RRC signaling message;

(2) a method using an RNSAP/NBAP signaling message and a TFCI; and (3) a method using a frame protocol and a TFCI.

First, the method using the RNSAP/NBAP signaling message and the RRC signaling message will be described with reference to FIG. 25.

Figure 25:
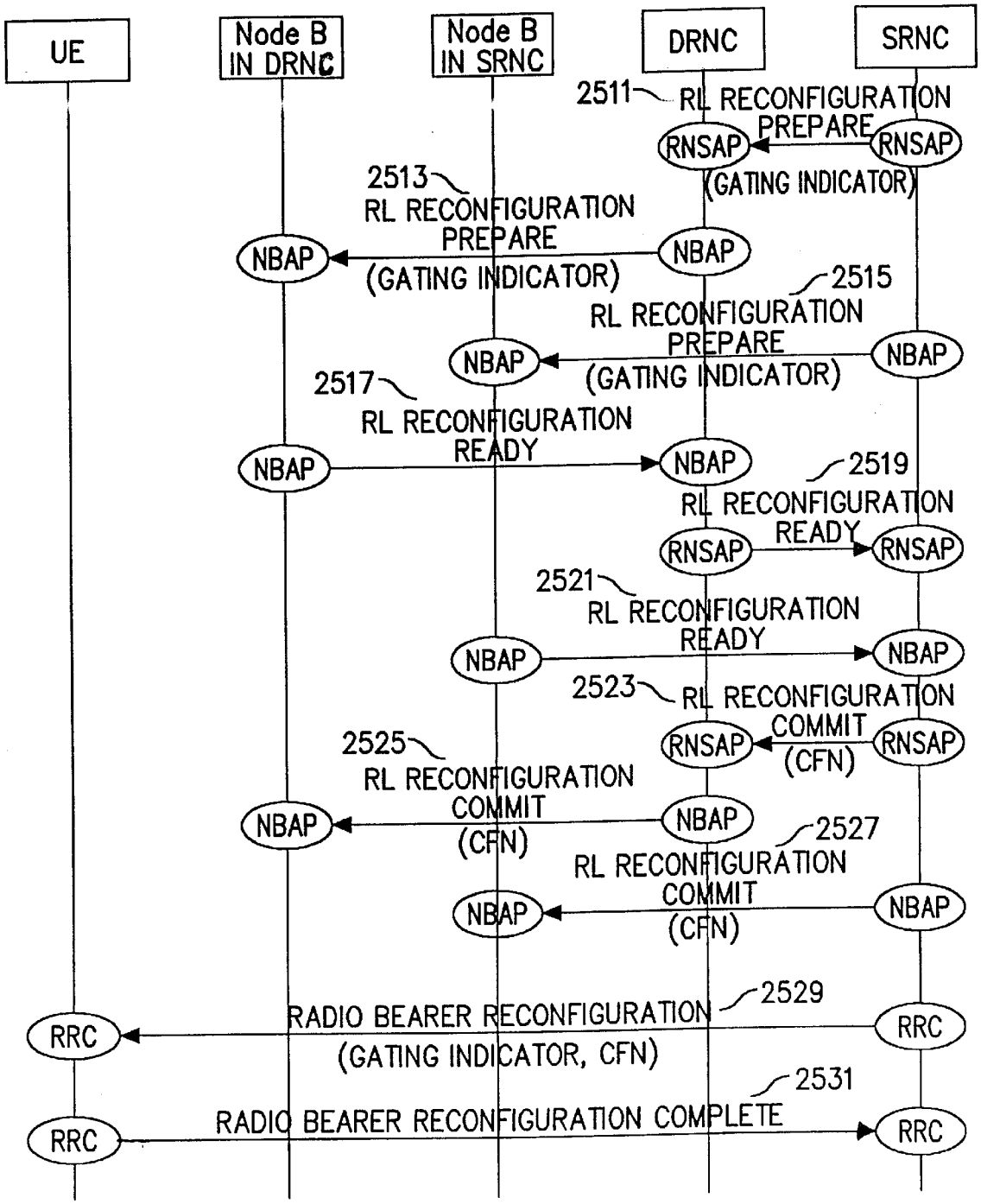
FIG. 25 is a signal flow diagram illustrating a process for starting and ending a gating operation using an RNSAP/NBAP signaling message and an RRC signaling message according to another embodiment of the present invention.

FIG. 25 is a signal flow diagram illustrating a process for starting and ending a gating operation using an RNSAP/NBAP signaling message and an RRC signaling message. The SRNC transmits an RL Reconfiguration Prepare message being an NBAP/RNSAP message, with a gating indicator being a gating parameter included therein, and also transmits to the UE a Radio Bearer Reconfiguration message, a Transport Channel Reconfiguration message or a Physical Channel Reconfiguration message, all of which are RRC messages, with the gating rate and the gating indicator included therein, in order to start/end the gating operation. If the gating operation is currently performed, the SRNC and the UE avoid transmitting a downlink shared channel DSCH and a dedicated traffic channel DTCH. That is, every radio bearer excepting a signaling bearer exists in a suspended state. Here, the gating start operation and the gating end operation are synchronously performed, since a Synchronized Radio Link Reconfiguration procedure and a Synchronized Radio Bearer Reconfiguration procedure have a synchronizable starting time. That is, the Node B and the UE can simultaneously initiate the gating start operation and the gating end operation.

This will be described in more detail with reference to FIG. 25.

In step 2511, the SRNC prepares to start or end the gating oration by transmitting an RL Reconfiguration Prepare message with a gating indicator to the DRNC. In step 2513, the DRNC transmits to the Node B an RL Reconfiguration Prepare message with a gating indicator to request the gating start or end operation. In step 2515, the SRNC also transmits to the Node B an RL Reconfiguration Prepare message with a gating indicator to request the gating start or end operation. Then, in step 2517, the Node B that has received the RL Reconfiguration Prepare message in step 2513, prepares for the gating operation, and notifies this to the DRNC using an RL Reconfiguration Ready message. In step 2519, the DRNC transmits an RL Reconfiguration Ready message to the SRNC. In addition, in step 2521, the Node B that has prepared for the gating operation notifies this to the SRNC using an RL Reconfiguration Ready message. In step 2523, the SRNC transmits an RL Reconfiguration Commit message being an RNSAP message to the DRNC, to request the gating start or end operation to be performed at a preset time (Connection Frame Number (CFN)). Upon receipt of the RL Reconfiguration Commit message, the DRNC transmits an RL Reconfiguration Commit message being an NBAP message to the Node B in step 2525, to request the gating start or end operation. In step 2527, the SRNC transmits an RL Reconfiguration Commit message being an NBAP message to the Node B to request the gating start or end operation. In addition, in step 2529, the SRNC transmits a Radio Bearer Reconfiguration message being an RRC message with a gating indicator to the UE, to request the gating start and end operation. Thus, in step 2531, the UE transmits to the SRNC a Radio Bearer Reconfiguration Complete message being a response message responding to the received Radio Bearer Reconfiguration message, and starts or ends the gating operation at the preset time according to the CFN value.

Second, the method using the RNSAP/NBAP signaling message and the TFCI will be described with reference to FIG. 26.

Figure 26:
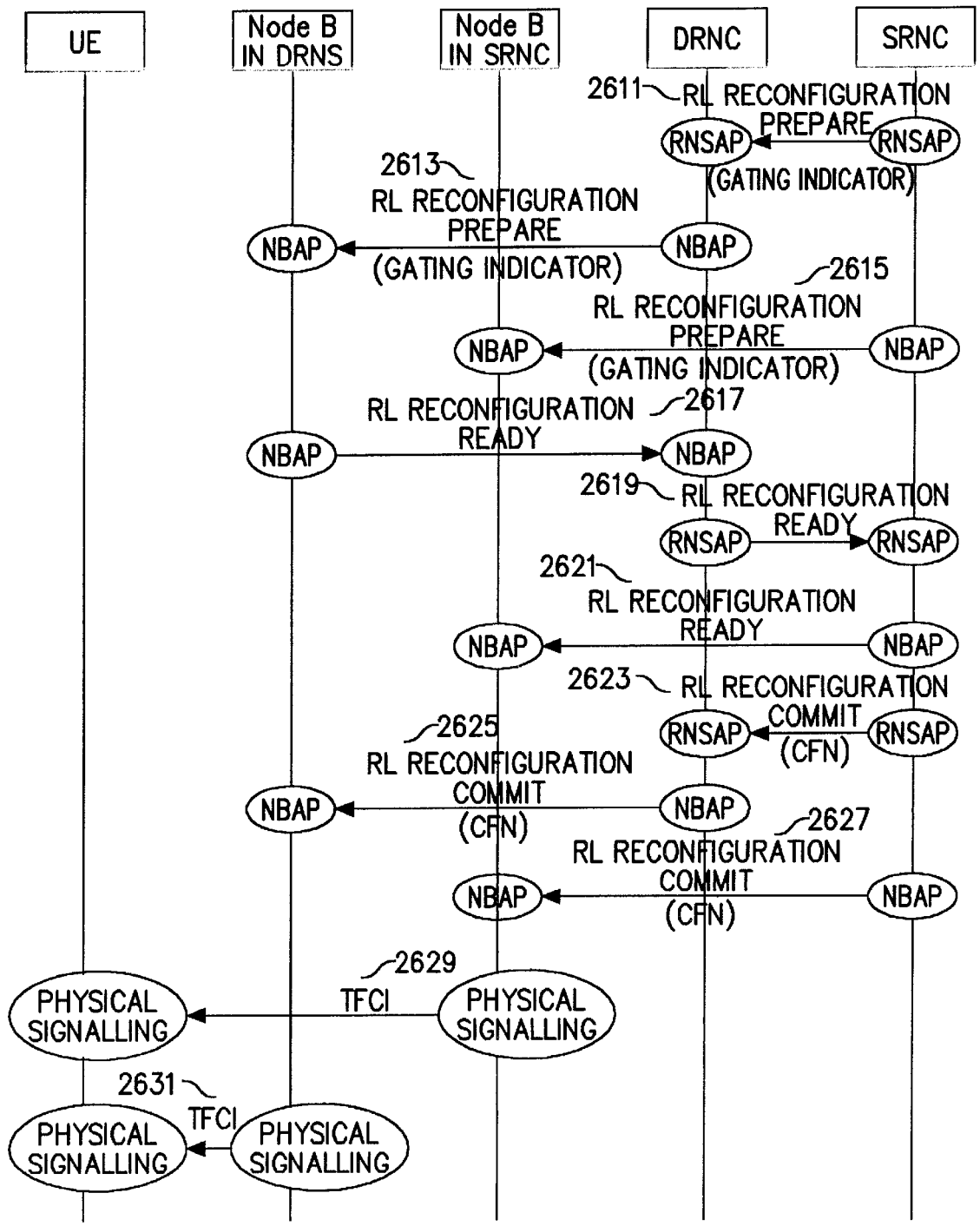
FIG. 26 is a signal flow diagram illustrating a process for starting and ending a gating operation using an RNSAP/NBAP signaling message and a TFCI according to another embodiment of the present invention.

FIG. 26 is a signal flow diagram illustrating a process for starting and ending a gating operation using an RNSAP/NBAP signaling message and a TFCI according to another embodiment of the present invention. Summarizing the process of FIG. 26, the SRNC transmits a Radio Link Reconfiguration Prepare message being an NBAP/RNSAP message with a gating indicator being a gating parameter, when it determines to start or end the gating operation. Upon receipt of this message, the Node B sends a TFCI indicating a start or end of the gating operation through a DPCCH channel. During the gating operation, the SRNC and the UE can avoid transmitting both the DSCH channel and the DTCH channel, i.e., can be in the suspended state. At this moment, a signaling channel is exceptional. If the radio bearer cannot be in the suspended state, a previously designated Transport Format Combination Set can be used in a MAC stage during the gating operation. In order to maintain the high reliability, it is possible to repeatedly transmit the TFCI for a start and end of the gating operation.

This will be described in detail with reference to FIG. 26.

In step 2611, the SRNC transmits an RL Reconfiguration Prepare message with a gating indicator to the DRNC, to request preparation for the gating start and end operation. In step 2613, the DRNC transmits to the Node B an RL Reconfiguration Prepare message with a gating indicator to request preparation for the gating start and end operation. In step 2615, the SRNC also transmits to the Node B an RL Reconfiguration Prepare message with a gating indicator to request preparation for the gating start and end operation. In step 2617, the Node B makes ready to perform the gating operation, and transmits an RL Reconfiguration Ready message to the DRNC to inform that the Node B is ready to perform the gating operation. In step 2619, the DRNC transmits an RL Reconfiguration Ready message to the SRNC to inform that the DRNC is ready to perform the gating operation. In step 2621, the Node B makes ready to perform the gating operation, and transmits an RL Reconfiguration Ready message to the SRNC to inform that the Node B is ready to perform the gating operation. In step 2623, the SRNC transmits an RL Reconfiguration Commit message being an RNSAP message to the DRNC, to request execution of the gating start or end operation. In step 2625, the DRNC transmits an RL Reconfiguration Commit message being an NBAP message to the Node B, to request execution of the gating start or end operation. In step 2627, the SRNC transmits an RL Reconfiguration Commit message being an NBAP message to the Node B to request the gating start or end operation. In step 2629, the Node B belonging to the SRNC, sends the UE a TFCI bit indicating a start or end of the gating operation using the DPCCH channel in order to start or end the gating operation. After transmitting the TFCI, the Node B starts or ends the gating operation. Upon receipt of the TFCI, the UE also starts or ends the gating operation.

Third, the method using the frame protocol and the TFCI will be described with reference to FIG. 27.

Figure 27:
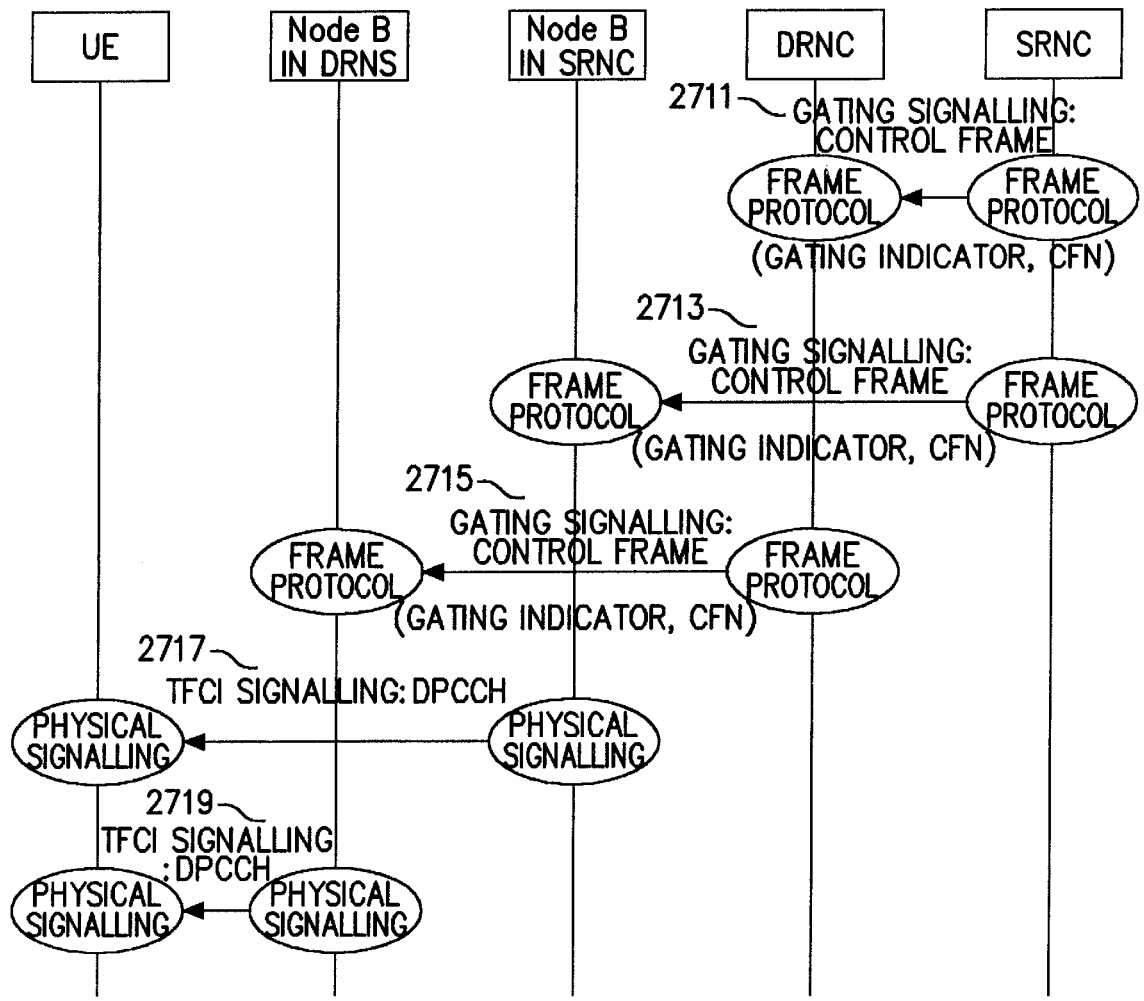
FIG. 27 is a signal flow diagram illustrating a process for starting and ending a gating operation using a frame protocol and a TFCI according to another embodiment of the present invention.

FIG. 27 is a signal flow diagram illustrating a process for starting and ending a gating operation using a frame protocol and a TFCI according to another embodiment of the present invention. Summarizing the process of FIG. 27, the SRNC transmits to the Node Bs a gating signaling being a control frame with a gating indicator being a gating parameter, when it determines to start or end the gating operation. Upon receipt of the message, the Node Bs each send a TFCI indicating a start or end of the gating operation through the DPCCH channel. During the gating operation, the SRNC and the UE can avoid transmitting data over the DSCH channel and the DTCH channel. If it is not possible to temporarily put a radio bearer in the suspended state, a predefined TFCI can be used in a MAC stage even during the gating operation. The gating start operation and the gating end operation can be synchronously performed, since the control frame includes CFN which is used as a reference time for the gating start and end operation. In order for the receiver to correctly receive the TFCI used for the gating start and end operation, it is possible to transmit the TFCI several times. In addition, the UE can also use a TFCI for requesting the gating end operation.

This will be described in detail with reference to FIG. 27.

In step 2711, the SRNC transmits a gating signaling control frame with a gating indicator, to request the gating start and end operation. Here, the control frame being a gating signaling for the gating operation can be transmitted through a user plane. The control frame, when transmitted through the user plane, has less propagation delay compared with when it is transmitted through a control plane, thus contributing to the high-speed transmission. In step 2713, upon receipt of the control frame from the SRNC, the DRNC transmits the gating signaling control frame to the Node B to request the gating start and end operation, in order to start or end the gating operation. Here, the control frame being a gating signaling, transmitted from the SRNC to the Node B, can also be transmitted through the user plane. The control frame, when transmitted through the user plane, has less propagation delay compared with when it is transmitted through the control plane, thus contributing to the high-speed transmission. In the case of the user plane, the less propagation delay increases a transmission speed of the control frame, but decreases transmission reliability of the control frame, so that the control frame may be lost during transmission. Therefore, the present invention discloses in FIG. 28 a gating operation signaling transmission method capable of guaranteeing the signaling transmission reliability while increasing the transmission speed by transmitting the signaling for the gating start and end operation through the user plane. A method for guaranteeing the reliability in the signaling transmission process for the gating operation through the user plane will be described later with reference to FIG. 28. In addition, in FIG. 28, for the gating indicator for the gating start and end operation through the user plane, it is possible to select one of the messages used in the user plane, for example, a Radio Interface Parameter Update message. A method for transmitting the gating indicator using the selected one of the messages on the user plane will also be described later with reference to FIG. 28.

In step 2715, the SRNC transmits the gating signaling control frame for starting and ending the gating operation to the Node B belonging to the SRNC, to request the gating start and end operation. In step 2717, the Node B belonging to the SRNC transmits a TFCI bit indicating the gating start or end operation over the DPCCH. After transmitting the TFCI, the Node B starts or ends the gating operation. In step 2719, the Node B belonging to the DRNC transmits a TFCI bit indicating the gating start or end operation over the DPCCH. Upon receipt of the TFCI, the UE starts or ends the gating operation according to the received TFCI.

Meanwhile, it is also possible to start and end the gating operation in another method excepting the above three gating start and end methods. First, the gating start operation is performed using the RNSAP/NBAP and RRC signaling messages, while the gating end operation is performed using the RNSAP/NBAP signaling message and the TFCI. Second, the gating start operation is performed using the RNSAP/NBAP and RRC signaling messages, while the gating end operation is performed using the frame protocol and the TFCI. That is, the new method is available to both of the above methods. In addition, it is also possible to use the frame protocol in the process of up to step 2715 of FIG. 27, for reconfiguring the Node B, and use the RRC message for the UE.

Now, a method for reliably transmitting a gating signaling through the user plane will be described with reference to FIG. 28.

Figure 28:
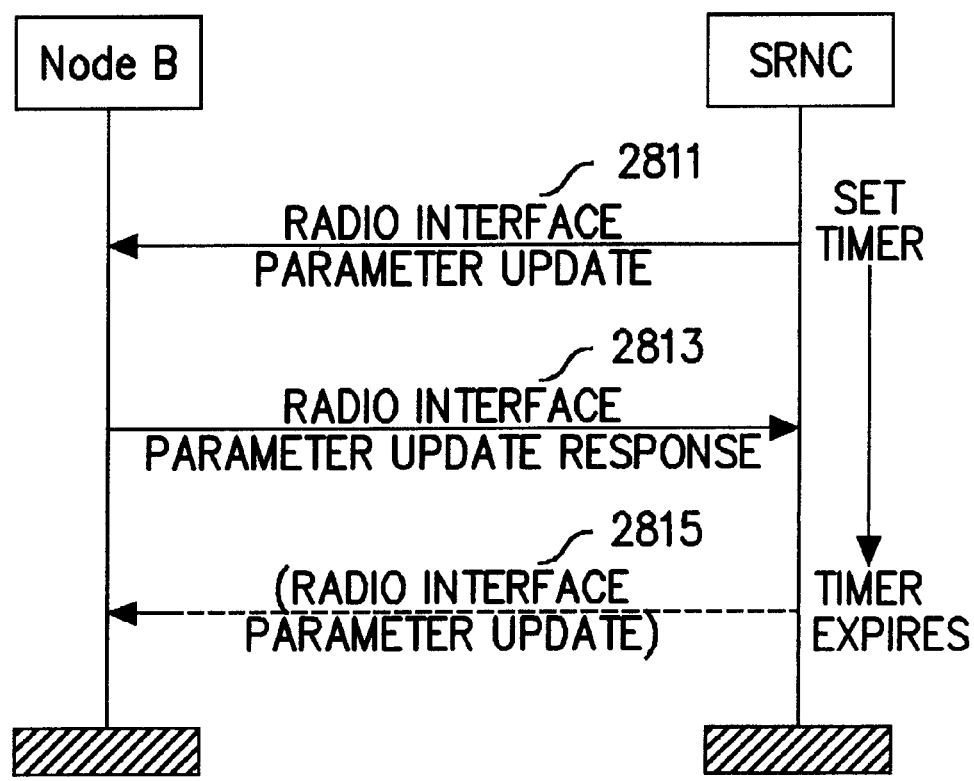
FIG. 28 is a flow diagram illustrating a process for transmitting a gating signaling through a user plane according to another embodiment of the present invention.

FIG. 28 is a flow diagram illustrating a process for transmitting a gating signaling through a user plane according to another embodiment of the present invention. Particularly, FIG. 28 shows that the step 2713 of FIG. 27, i.e., the process for transmitting the gating signaling message from the SRNC to the Node B is performed in the user plane to increase the reliability.

In the embodiment of the present invention shown in FIG. 28, the signaling, i.e., the gating indicator indicating the gating start and end operation is included in one of the control messages transmitted through the user plane, i.e., included in a Radio Interface Parameter Update message before transmission. That is, it is possible to start or end the gating operation by designating a second unused bit out of the control information of the first two bits constituting the Radio Interface Parameter Update message as a gating indicator and then setting the second bit to '1'. For example, if the second bit is set to '1' while the gating operation is currently performed, the gating operation is ended. On the other hand, if the second bit is set to '1' while the gating operation is not currently performed, the gating operation is started. Although the present invention has been described with reference to an embodiment for including the user indicator in the Radio Interface Parameter Update message out of the control messages transmitted through the user plane before transmission, it is possible to use any control message transmitted through the user plane, if it has a reserved area in which the gating indicator can be included.

Now, the process for reliably transmitting the gating signaling through the user plane will be described with reference to FIG. 28.

The SRNC transmits a message, for example, a Radio Interface Parameter Update message being a control message of the user plane to the Node B (Step 2811). Since the Radio Interface Parameter Update message is transmitted through the user plane, it is not possible to guarantee the message transmission reliability. Therefore, the SRNC transmits the Radio Interface Parameter Update message and at the same time, starts driving a timer included in the SRNC itself, so as to wait a preset time for a response message from the Node B, indicating that the Radio Interface Parameter Update message has been received. Here, the "preset time" that the SRNC waits is set considering a round trip time of the Radio Interface Parameter Update message.

When the SRNC transmits the Radio Interface Parameter Update message, the Node B receives the Radio Interface Parameter Update message. The Node B then checks a CRC (Cyclic Redundancy Code) of the received Radio Interface Parameter Update message and determines whether it has been normally received. If the Radio Interface Parameter Update message has been normally received, the Node B transmits to the SRNC a Radio Interface Parameter Update Response message indicating that the Radio Interface Parameter Update Message has been normally received (Step 2813). Here, the Radio Interface Parameter Update Response message is a message newly defined in the embodiment of the present invention. The Radio Interface Parameter Update Response message serves to indicate whether the message including the gating indicator indicating the gating start and end operation has been successfully received. In addition, it is possible to use any other control messages transmitted from the user plane, if they can acknowledge receipt of the gating signaling-related message.

Upon receipt of the Radio Interface Parameter Update Response message from the Node B, the SRNC determines that the Radio Interface Parameter Update message has been normally transmitted, and then ends the operation. However, upon failure to receive the Radio Interface Parameter Update Response message from the Node B within the preset time, the SRNC determines that the Radio Interface Parameter Update message transmitted to the Node B has been lost. Thus, the SRNC retransmits the Radio Interface Parameter Update message to the Node B (Step 2815). Accordingly, the gating signaling transmission method through the user plane according to the present invention not only increases the transmission speed through the user plane but also secures the reliability.

Figure 29:
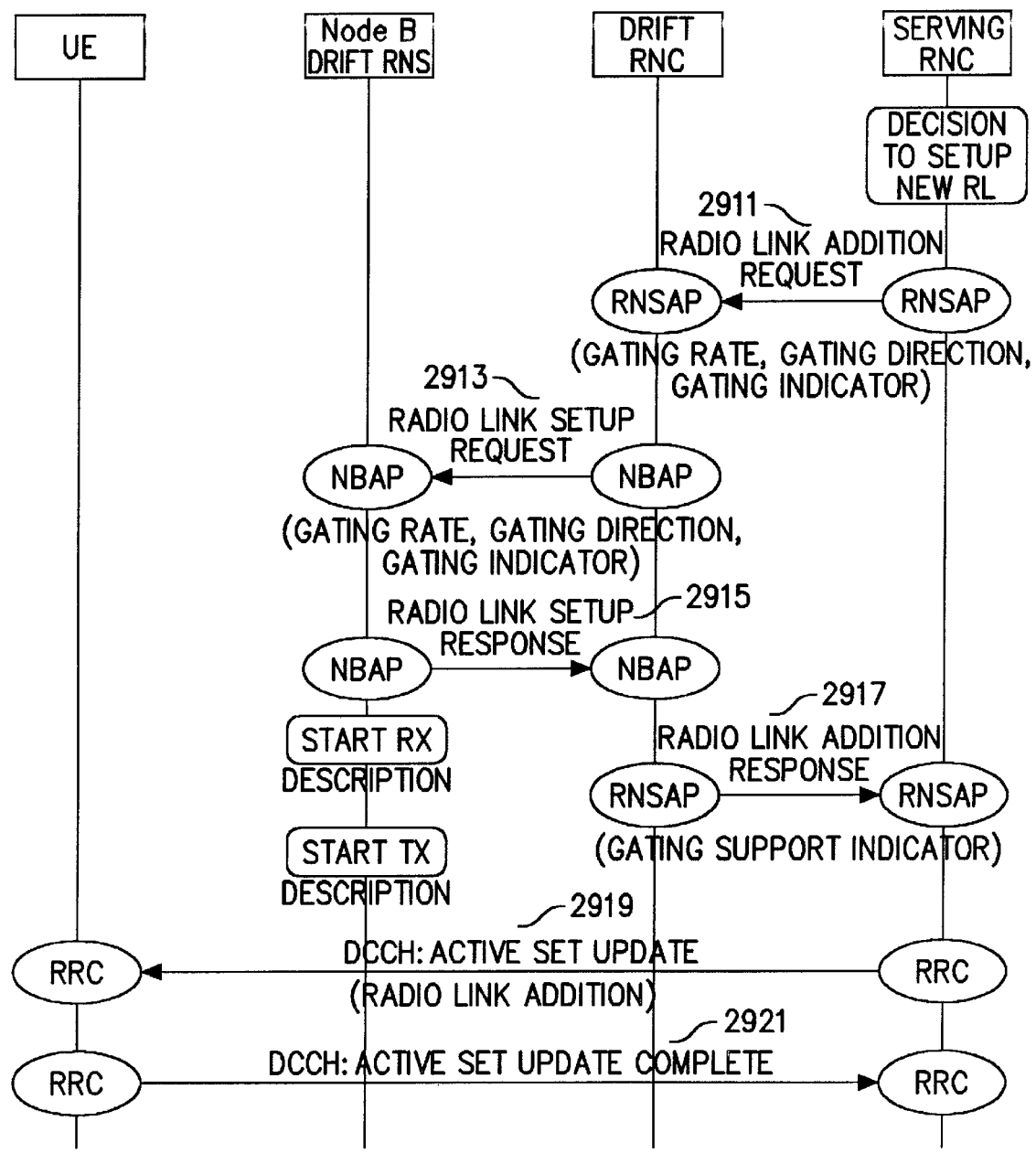
FIG. 29 is a signal flow diagram illustrating a handover process during a gating operation using RNSAP and NBAP signaling messages and an RRC signaling message according to another embodiment of the present invention.

FIG. 29 is a signal flow diagram illustrating a handover process during a gating operation according to another embodiment of the present invention. In particular, FIG. 29 is a signal flow diagram illustrating a handover process during a gating operation using RNSAP, NBAP and RRC signaling messages.

Summarizing the process of FIG. 29, the SRNC transmits a Radio Link Addition Request or a Radio Link Addition Request message to the DRNC, when it intends to set up a new radio link through the DRNC during the gating operation. This message transmits such gating information as the gating rate and the gating direction, and also transmits to the DRNC an indicator indicating that the gating operation is being performed. The indicator transmitted at this moment is called a gating indicator. Upon receipt of the gating indicator, the Node B can start transmitting and receiving data based on the gating information, i.e., the gating rate and the gating direction. When setting up a new radio link to a cell which does not support the gating operation during a handover, the SRNC ends the gating operation. In order to end the gating operation, the SRNC may use the gating indicator. To end the gating operation during a handover, the SRNC can transmit to the UE an Active Set Update message being an RRC message with the gating indicator.

The summarized handover process during the gating operation will be described in detail with reference to FIG. 29.

In step 2911, the SRNC determines to set up a new radio link through the DRNC and then transmits a Radio Link Addition Request message being an RNSAP message to the DRNC. The SRNC transmits the message with the gating indicator indicating that the gating operation is being performed. The gating indicator inserted in the message is an indicator indicating that the gating operation is ON or OFF. In step 2913, upon receipt of the gating information from the SRNC, the DRNC transmits the received information to the Node B using a Radio Link Setup Request message being an NBAP message. The information transmitted at this moment is the gating indicator. In step 2915, upon receipt of the gating information, the Node B starts exchanging data with the UE using the received information. In addition, when the radio link is successfully set up, the Node B transmits a Radio Link Setup Response message being an NBAP message to the RNC. In step 2917, upon receipt of the Radio Link Setup Response message from the Node B, the DRNC transmits a Radio Link Addition Response message being an RNSAP message to the SRNC. In step 2919, when the SRNC has successfully set up a radio link to a new cell, it transmits an Active Set Update message being an RRC message. If the radio link is set up to a cell which does not support the gating operation, the SNRC transmits the Active Set Update message with a gating indicator indicating an end of the gating operation. In step 2921, the UE transmits an Active Set Update Complete message being an RRC message to the SRNC. The UE starts communication with the new radio link and maintains the gating operation if the gating operation is being performed.

Figure 30:
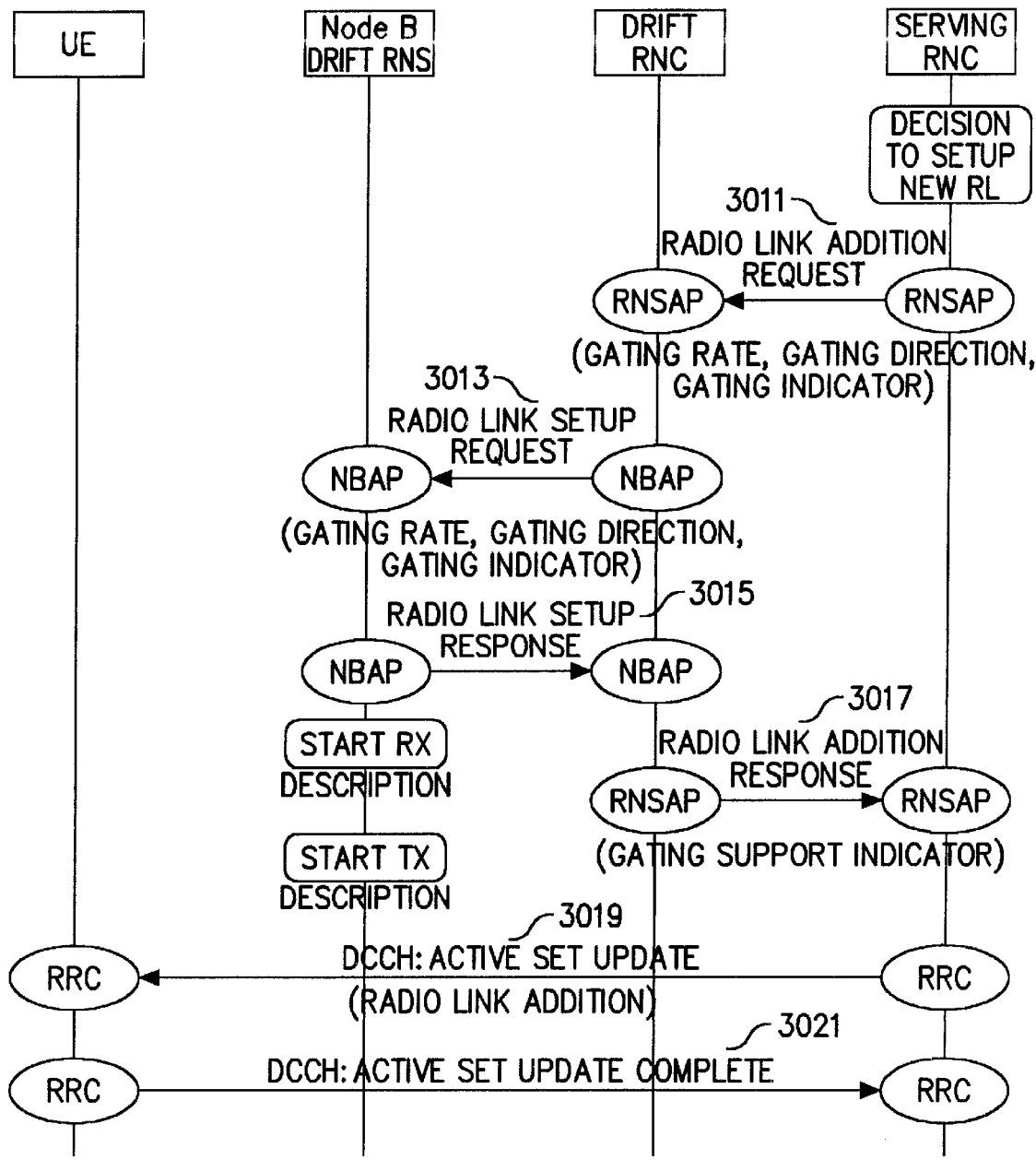
FIG. 30 is a signal flow diagram illustrating a handover process during a gating operation using an RNSAP/NBAP signaling process and a TFCI according to another embodiment of the present invention.

FIG. 30 is a signal flow diagram illustrating a handover process during a gating operation using an RNSAP/NBAP signaling process and a TFCI according to another embodiment of the present invention. In particular, FIG. 29 is a signal flow diagram illustrating a handover process during a gating operation using RNSAP, NBAP and RRC signaling messages.

Summarizing the process of FIG. 30, the SRNC transmits a Radio Link Addition Request or a Radio Link Addition Request message to the DRNC, when it intends to set up a new radio link through the DRNC during the gating operation. This message transmits such gating information as the gating rate and the gating direction, and also transmits to the DRNC an indicator indicating that the gating operation is being performed. Upon receipt of the gating indicator, the Node B can start transmitting and receiving data based on the gating information, i.e., the gating rate and the gating direction. When setting up a new radio link to a cell which does not support the gating operation during a handover, the SRNC ends the gating operation. In order to end the gating operation, the SRNC may use the gating indicator. To end the gating operation during a handover, the SRNC transmits the corresponding signaling message to the Node B, and the Node B transmits a TFCI for ending the gating operation.

The handover process during the gating operation will be described in detail with reference to FIG. 30.

In step 3011, the SRNC determines to set up a new radio link through the DRNC and then transmits a Radio Link Addition Request message being an RNSAP message to the DRNC. The SRNC transmits the message with the gating indicator indicating that the gating operation is being performed. The gating indicator inserted in the message is an indicator indicating that the gating operation is ON or OFF. In step 3013, upon receipt of the gating information from the SRNC, the DRNC transmits the received information to the Node B using a Radio Link Setup Request message being an NBAP message. The information transmitted at this moment is the gating indicator. In step 3015, upon receipt of the gating information, the Node B starts exchanging data with the UE using the received information. In addition, when the radio link is successfully set up, the Node B transmits a Radio Link Setup Response message being an NBAP message to the RNC. In step 3017, upon receipt of the Radio Link Setup Response message from the Node B, the DRNC transmits a Radio Link Addition Response message being an RNSAP message to the SRNC. In step 3019, when the SRNC has successfully set up a radio link to a new cell, it transmits an Active Set Update message being an RRC message. When the SRNC has attempted to set up a radio link to a Node B which does not support the gating operation, the SNRC starts a gating end process. That is, the SRNC transmits a Radio Link Reconfiguration message to the Node Bs and also transmits the TFCI for ending the gating operation of the Node Bs. In step 3021, the UE transmits an Active Set Update Complete message being an RRC message to the SRNC. The UE starts communication with the new radio link and maintains the gating operation if the gating operation is being performed.

Figure 31:
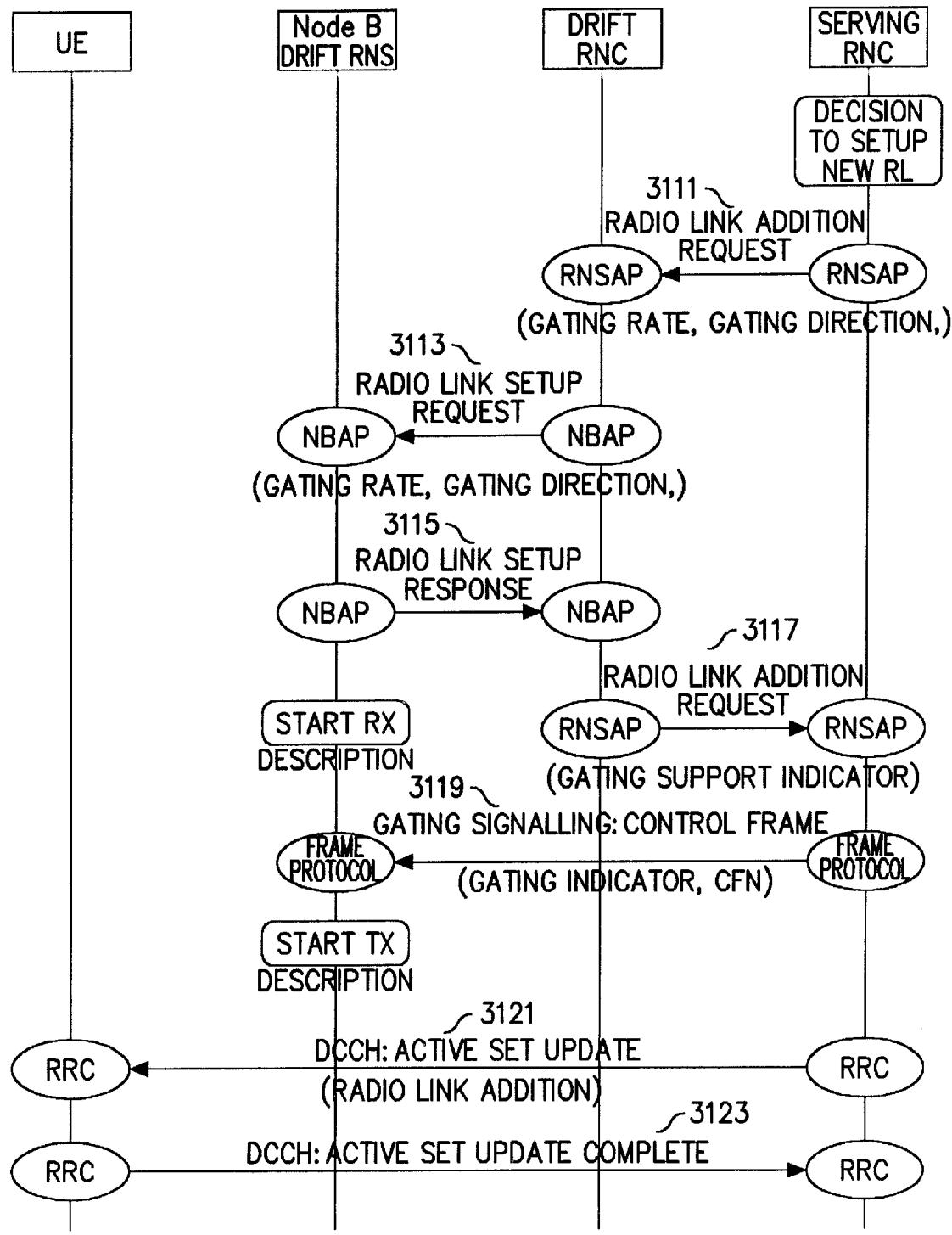
FIG. 31 is a signal flow diagram illustrating a handover process during a gating operation using a frame protocol signaling process and a TFCI according to another embodiment of the present invention.

FIG. 31 is a signal flow diagram illustrating a handover process during a gating operation using a frame protocol signaling process and a TFCI according to another embodiment of the present invention.

Summarizing the process of FIG. 31, the SRNC transmits a Radio Link Addition Request or a Radio Link Addition Request message to the DRNC, when it intends to set up a new radio link through the DRNC during the gating operation. This message transmits such gating information as the gating rate and the gating direction. When the SRNC is ready to set up the radio link, the SRNC transmits a gating signaling control frame with a gating indictor to the Node B to inform the Node B that the gating operation is being performed. Upon receipt of the gating indicator, the Node B can start transmitting and receiving data based on the gating information, i.e., the gating rate and the gating direction. When setting up a new radio link to a cell which does not support the gating operation during a handover, the SRNC ends the gating operation. In order to end the gating operation, the SRNC transmits to the Node B the gating indicator using the gating signaling control frame, and the Node B transmits a TFCI for ending the gating operation.

The handover process during the gating operation will be described in detail with reference to FIG. 31.

In step 3111, the SRNC determines to set up a new radio link through the DRNC and then transmits a Radio Link Addition Request message being an RNSAP message to the DRNC. In step 3113, upon receipt of the gating information from the SRNC, the DRNC transmits the received information to the Node B using a Radio Link Setup Request message being an NBAP message. In step 3115, when the radio link is successfully set up, the Node B transmits a Radio Link Setup Response message being an NBAP message to the RNC. The Node B can start receiving data from the UE. In step 3117, upon receipt of the Radio Link Setup Response message from the Node B, the DRNC transmits a Radio Link. Addition Response message being an RNSAP message to the SRNC. In step 3119, the SRNC transmits to the Node B the gating signaling control frame indicating that the gating operation is being performed. Information inserted in the gating signaling control frame includes the gating indicator indicating that the gating operation is being performed. Upon receipt of the information, the Node B transmits and receives data using the received gating information. In step 3121, when the radio link to the new cell is successfully set up, the SRNC transmits an Active Set Update message being an RRC message. When the SRNC has attempted to set up a radio link to a Node B which does not support the gating operation, the SNRC starts a gating end process. That is, the SRNC transmits a Radio Link Reconfiguration message to the Node Bs and also transmits the TFCI for ending the gating operation of the Node Bs. In step 3123, the UE transmits an Active Set Update Complete message being an RRC message to the SRNC. The UE starts communication with the new radio link and maintains the gating operation if the gating operation is being performed.

Figure 32:
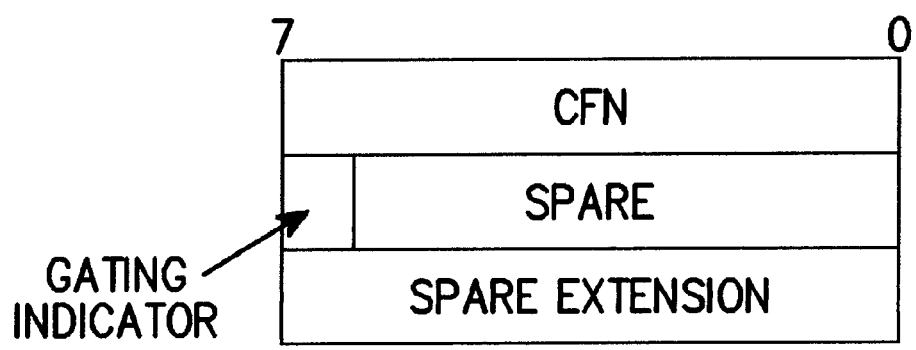
FIG. 32 is a diagram illustrating a format of a gating signaling control frame used in a frame protocol according to another embodiment of the present invention.

FIG. 32 is a diagram illustrating a format of a gating signaling control frame used: in a frame protocol according to another embodiment of the present invention. The gating signaling control frame is comprised of a CFN indicating time information, and a gating indicator indicating a start or end of the gating operation.

The present invention has the following advantages.

First, when the downlink physical shared channel and the dedicated physical channel are interlinked with each other, the number of UEs using the downlink physical shared channel is increased by gating a dedicated physical control channel of the dedicated physical channel, thereby increasing the resource efficiency of the downlink physical shared channel. Accordingly, an amount of data transmitted over the downlink physical shared channel per unit time is increased.

Second, it is possible to decrease the delay time required for the gating start and end operation by issuing a gating start command and a gating end command using a specific TFCI symbol of the dedicated physical channel. That is, since it is possible to directly perform the gating operation in the physical layer without passing through the upper layer, the delay time required for the gating start and end operation is decreased compared with when the gating start and end commands are transmitted using the upper layer message.

Third, since it is possible to directly perform the gating start and end operation in the physical layer, an exchange of the control signals between the RNC and the UE is not required and accordingly, the delay time is not generated, thus contributing to a decrease in complexity of the Node B/RNC system and an increase in the system efficiency.

Fourth, it is possible to prevent quality deterioration of transmission data, when transmitting data by controlling transmission power during the gating operation on the dedicated physical control channel. In addition, it is possible to prevent quality deterioration of the transmission data due to the gating operation by rapidly recovering the power control loop during transition from the gating oration to the normal operation.

Fifth, since the UE performing a gating operation on a dedicated physical control channel can directly request an end of the gating operation on the dedicated physical control channel, it is possible to adaptively perform the gating operation according to the UE conditions.

Sixth, it is possible to provide interlayer interfacing for gating start and end control by providing a message protocol for starting and end the gating operation.

Seventh, it is possible to reliably transmit a gating signaling related to the start and end of the gating operation through the user plane, and also increase adaptiveness of the gating operation by increasing the transmission speed of the gating signaling.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for gating a dedicated physical control channel in a UTRAN (UMTS (Universal Mobile Terrestrial System) Terrestrial Access Network) having a downlink physical shared channel, shared by a plurality of UEs (User Equipments), for transmitting data, a dedicated physical control channel interlined with the downlink physical shared channel, for transmitting control data, and a dedicated physical data channel for transmitting user data, the apparatus comprising:

a gating command generator for generating a gating start request for the dedicated physical control channel when there exists no data transmitted over the downlink physical shared channel and the dedicated physical data channel for a preset time, generating a gating end request when data to be transmitted over the downlink physical shared channel is generated while gating the dedicated physical control channel, and generating a gating start command or a gating end command to start or end a gating operation according to the gating start request or the gating end request; and a transmitter for inserting the created gating start command or gating end command in a specific transport format combination indicator symbol of the dedicated physical control channel, and transmitting the specific transport format combination indicator symbol to a corresponding UE.

2. The apparatus as claimed in claim 1, further comprising a controller for setting transmission power of the specific transport format combination indicator symbol including the gating start command or the gating end command to be higher by a preset value than transmission power of the transport format combination indicator symbol during a normal operation.

3. The apparatus as claimed in claim 2, wherein the controller repeatedly transmits the specific transport format combination indicator symbol including the gating start command or the gating end command for one or more frames.

4. The apparatus as claimed in claim 2, wherein the controller starts the gating operation after a lapse of a preset gating start execution time after transmitting the transport format combination indicator symbol including the gating start command.

5. The apparatus as claimed in claim 3, wherein the controller starts the gating operation when transmitting a first gating start command out of the repeatedly transmitted gating start commands.

6. The apparatus as claimed in claim 5, wherein the controller starts the gating operation after a lapse of a preset gating start execution time after transmitting the first gating start command.

7. The apparatus as claimed in claim 1, wherein the transport format combination indicator symbol is a transport format combination indicator symbol of the downlink physical shared channel.

8. The apparatus as claimed in claim 1, wherein the specific transport format combination indicator symbol is a transport format combination indicator symbol of the dedicated physical data channel.

9. The apparatus as claimed in claim 4, wherein the controller transmits the gating start command through the specific transport format combination indicator symbol in a preset frame period unit during the gating operation.

10. The apparatus as claimed in claim 5, wherein the controller transmits to the corresponding UE the gating start command through the specific transport format combination indicator symbol in a preset frame period unit during the gating operation.

11. The apparatus as claimed in claim 3, wherein the controller sets transmission power of a signal transmitted over the downlink physical shared channel to be higher by a preset value than normal transmission power only for frames, the number of which is smaller by one than the number of frames transmitting the transport format combination indicator symbol at increased transmission power.

12. The apparatus as claimed in claim 11, wherein the controller recovers a power control loop after transmitting the transport format combination indicator symbol at transmission power increased by a preset value in a first frame out of a plurality of the frames.

13. The apparatus as claimed in claim 11, wherein the controller sets a power control step for a power control loop recovery interval to be higher than transmission power corresponding to a power control command in a normal operation interval, after transmitting the transport format combination indicator symbol at transmission power increased by a preset value in a first frame out of a plurality of the frames.

14. The apparatus as claimed in claim 13, wherein the power control loop recovery interval is an interval generated in a process of transitioning to the normal operation from the gating operation.

15. The apparatus as claimed in claim 12, wherein when the power control loop is recovered, the power control step is set to be equal to that in a normal operation interval.

16. The apparatus as claimed in claim 1, wherein the transmitter increases transmission power of the transport format combination indicator symbol including the gating end command so as to maintain a frame error rate to be equal to a frame error rate during the normal operation.

17. An apparatus for gating a dedicated physical control channel in a UE sharing a downlink physical shared channel and having a dedicated physical control channel for receiving control data and a dedicated physical data channel for receiving user data, the apparatus comprising:

a dedicated physical control channel receiver for receiving a dedicated physical control channel signal; and a gating controller for analyzing a transport format combination indicator symbol of the received dedicated physical control channel signal, starting gating on the dedicated physical control channel when the transport format combination indicator symbol includes a gating start command for the dedicated physical control channel, and ending gating on the dedicated physical control channel when the transport format combination indicator symbol includes a gating end command.

18. The apparatus as claimed in claim 17, wherein the gating controller starts gating after a lapse of a preset gating start execution time after detecting the gating start command.

19. The apparatus as claimed in claim 17, wherein the transport format combination indicator symbol is a transport format combination indicator symbol of the downlink physical shared channel.

20. The apparatus as claimed in claim 17, wherein the transport format combination indicator symbol is a transport format combination indicator symbol of the dedicated physical data channel.

21. The apparatus as claimed in claim 17, wherein the gating end command indicates that there exists data to be received at the next frame over the downlink physical shared channel.

22. The apparatus as claimed in claim 17, wherein the gating controller increases a power control step in a power control loop recovery interval to be higher than a power control step during a normal operation after starting the gating end operation.

23. The apparatus as claimed in claim 22, wherein the gating controller sets the power control step to be equal to a power control step during the normal operation when the power control loop is recovered after starting the gating end operation.

24. A method for gating a dedicated physical control channel in a UTRAN having a downlink physical shared channel, shared by a plurality of UEs, for transmitting data, a dedicated physical control channel interlined with the downlink physical shared channel, for transmitting control data, and a dedicated physical data channel for transmitting user data, the method comprising the steps of:

generating a gating start request for the dedicated physical control channel when there exists no data transmitted over the downlink physical shared channel and the dedicated physical data channel for a preset time, generating a gating end request when data to be transmitted over the downlink physical shared channel is generated while gating the dedicated physical control channel, and generating a gating start command or a gating end command to start or end a gating operation according to the gating start request or the gating end request; and inserting the created gating start command or gating end command in a specific transport format combination indicator symbol of the dedicated physical control channel, and transmitting the specific transport format combination indicator symbol to a corresponding UE.

25. The method as claimed in claim 24, further comprising the step of setting transmission power of the specific transport format combination indicator symbol including the gating start command or the gating end command to be higher by a preset value than transmission power of the transport format combination indicator symbol during a normal operation.

26. The method as claimed in claim 24, wherein the gating start command or the gating end command inserted in the specific transport format combination indicator is repeatedly transmitted for a plurality of frames.

27. The method as claimed in claim 24, further comprising the step of starting the gating operation after a lapse of a preset gating start execution time after transmitting the transport format combination indicator symbol including the gating start command.

28. The method as claimed in claim 24, further comprising the step of starting the gating operation when transmitting a first gating start command out of the repeatedly transmitted gating start commands.

29. The method as claimed in claim 28, further comprising the step of starting the gating operation after a lapse of a preset gating start execution time after transmitting the first gating start command.

30. The method as claimed in claim 24, wherein the transport format combination indicator symbol is a transport format combination indicator symbol of the downlink physical shared channel.

31. The method as claimed in claim 24, wherein the specific transport format combination indicator symbol is a transport format combination indicator symbol of the dedicated physical data channel.

32. The method as claimed in claim 31, further comprising the step of transmitting the gating start command through the specific transport format combination indicator symbol in a preset frame period unit during the gating operation.

33. The method as claimed in claim 28, further comprising the step of transmitting the gating start command through the specific transport format combination indicator symbol in a preset frame period unit during the gating operation.

34. The method as claimed in claim 26, further comprising the step of setting transmission power of a signal transmitted over the downlink physical shared channel to be higher by a preset value than normal transmission power only for frames, the number of which is smaller by one than the number of frames transmitting the transport format combination indicator symbol at increased transmission power.

35. The method as claimed in claim 34, further comprising the step of recovering a power control loop after transmitting the transport format combination indicator symbol at transmission power increased by a preset value in a first frame out of a plurality of the frames.

36. The method as claimed in claim 35, further comprising the step of setting a power control step for a power control loop recovery interval to be higher than transmission power corresponding to a power control command in a normal operation interval, after transmitting the transport format combination indicator symbol at transmission power increased by a preset value in a first frame out of a plurality of the frames.

37. The method as claimed in claim 36, wherein the power control loop recovery interval is an interval generated in a process of transitioning to the normal operation from the gating operation.

38. The method as claimed in claim 37, further comprising the step of setting the power control step to be equal to that in a normal operation interval, when the power control loop is recovered.

39. The method as claimed in claim 24, further comprising the step of increasing transmission power of the transport format combination indicator symbol including the gating end command so as to maintain a frame error rate to be equal to a frame error rate during the normal operation.

40. A method for gating a dedicated physical control channel in a UE sharing a downlink physical shared channel and having a dedicated physical control channel for receiving control data and a dedicated physical data channel for receiving user data, the method comprising the steps of:

receiving a dedicated physical control channel signal; and performing a gating start operation or a gating end operation on the dedicated physical control channel according to a gating start command or a gating end command, when a transport format combination indicator symbol of the received dedicated physical control channel signal indicates the gating start command or the gating end command for the dedicated physical control channel.

41. The method as claimed in claim 40, wherein the gating operation on the dedicated physical control channel is started after a lapse of a preset gating start execution time after detecting the gating start command.

42. The method as claimed in claim 40, wherein the transport format combination indicator symbol is a transport format combination indicator symbol of the downlink physical shared channel.

43. The method as claimed in claim 40, wherein the transport format combination indicator symbol is a transport format combination indicator symbol of the dedicated physical data channel.

44. The method as claimed in claim 40, wherein the gating end command indicates that there exists data to be received at the next frame over the downlink physical shared channel.

45. The method as claimed in claim 40, further comprising the step of increasing a power control step in a power control loop recovery interval to be higher than a power control step during a normal operation after starting the gating end operation.

46. The method as claimed in claim 45, further comprising the step of setting the power control step to be equal to a power control step during the normal operation when the power control loop is recovered after starting the gating end operation.

47. A method for gating a dedicated physical control channel in a mobile communication system including a radio network controller and a Node B connected to the radio network controller, the Node B having a downlink physical shared channel shared by a plurality of UEs, for transmitting data, a dedicated physical control channel interlinked with the downlink physical shared channel, for transmitting control data, and a dedicated physical data channel for transmitting user data, the method comprising the steps of:

transmitting from the radio network controller to the Node B through a user plane a gating message including a gating indicator indicating a start of a gating operation on the dedicated physical control channel when there exists no data transmitted over the downlink physical shared channel and the dedicated physical data channel for a preset time, and transmitting a gating message including a gating indicator indicating an end of the gating operation when data to be transmitted over the downlink physical shared channel is generated while gating the dedicated physical control channel; and upon Node B's receipt of the gating message, transmitting an RRC message with a gating indicator to the UE so that the UE starts or ends the gating operation at a preset time.

48. The method as claimed in claim 47, further comprising the step of mapping the gating indictor indicating a start or end of the gating operation with a transport format combination indicator of a specific channel, and transmitting the mapped gating indicator from the Node B to the UE.

49. A method for gating a dedicated physical control channel in a mobile communication system including a radio network controller and a Node B connected to the radio network controller, the Node B having a downlink physical shared channel shared by a plurality of UEs, for transmitting data, a dedicated physical control channel interlinked with the downlink physical shared channel, for transmitting control data, and a dedicated physical data channel for transmitting user data, the method comprising the steps of:

transmitting to the Node B a gating message requesting setup of a new radio link together with a gating indicator indicating that a gating operation is being performed, when the radio network controller determines the UE performing the gating operation on the dedicated physical control channel performs a handoff;

upon Node B's receipt of the gating message, exchanging handoff data with a corresponding UE and setting up a new radio link according to the gating indicator, and informing the radio network controller that a new radio link has been set up; and maintaining in the ratio network controller the gating operation with the UE through the new radio link, upon receipt of the information indicating that a new radio link has been set up.

50. The method as claimed in claim 49, further comprising the step of upon receipt of the gating message, transmitting a response message indicating that the gating message has been normally received, from the Node B to the radio network controller.

51. The method as claimed in claim 50, further comprising the step of retransmitting the gating message from the radio network controller to the Node B, upon failure to receive the response message for a preset time after transmitting the gating message.

* * * * *